US010212489B2

(12) United States Patent
Bennett et al.

(10) Patent No.: US 10,212,489 B2
(45) Date of Patent: *Feb. 19, 2019

(54) VIDEO ADVERTISING SYSTEM

(71) Applicant: ENGINE MEDIA, LLC, Princeton, NJ (US)

(72) Inventors: Dominic Bennett, Los Altos, CA (US); Peter Wilmot, San Francisco, CA (US)

(73) Assignee: ENGINE MEDIA, LLC, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/994,397

(22) Filed: May 31, 2018

(65) Prior Publication Data
US 2018/0288495 A1 Oct. 4, 2018

Related U.S. Application Data

(63) Continuation of application No. 15/004,300, filed on Jan. 22, 2016, now Pat. No. 9,992,553.

(60) Provisional application No. 62/106,565, filed on Jan. 22, 2015.

(51) Int. Cl.
H04N 21/81 (2011.01)
H04N 21/266 (2011.01)
H04N 21/258 (2011.01)
H04N 21/2547 (2011.01)
H04N 21/234 (2011.01)

(52) U.S. Cl.
CPC ..... *H04N 21/812* (2013.01); *H04N 21/23418* (2013.01); *H04N 21/23424* (2013.01); *H04N 21/2547* (2013.01); *H04N 21/25833* (2013.01); *H04N 21/266* (2013.01)

(58) Field of Classification Search
None
See application file for complete search history.

(56) References Cited

U.S. PATENT DOCUMENTS

| 6,721,953 B1 | 4/2004 | Bates et al. |
| 6,724,403 B1 | 4/2004 | Santoro et al. |
| 7,779,438 B2 | 8/2010 | Davies |

(Continued)

FOREIGN PATENT DOCUMENTS

EP 2779151 9/2014

OTHER PUBLICATIONS

Search Report and Written Opinion dated Jun. 2, 2016 issued for International PCT Application No. PCT/US2016/014502 filed on Jan. 22, 2016.

*Primary Examiner* — An Son P Huynh
(74) *Attorney, Agent, or Firm* — K&L Gates LLP

(57) ABSTRACT

A video advertising system, methods, and apparatus are disclosed, which may include an advertising system, including an advertising server and advertising console, and a user device, which may cooperate to select video advertising campaigns and display video advertisements. In an example embodiment, a method includes playing a video on a display, overlaying markings on the video while the video plays, at a first time while the video plays, measuring a first refresh rate of the video, at a second time while the video plays, performing a first operation on the markings, measuring a second refresh rate of the video at the second time, and determining an estimated area of the video displayed on the display based on the first refresh rate and the second refresh rate. In an example embodiment, a prediction model is trained to output a viewability inference for a video.

26 Claims, 15 Drawing Sheets

(56) References Cited

U.S. PATENT DOCUMENTS

| | | |
|---|---|---|
| 8,327,395 B2 | 12/2012 | Lee et al. |
| 8,334,857 B1 | 12/2012 | Ogrinc et al. |
| 8,381,121 B2 | 2/2013 | Gupta et al. |
| 8,607,158 B2 | 12/2013 | Moiander et al. |
| 8,819,568 B1 | 8/2014 | Hull et al. |
| 9,147,199 B2 | 9/2015 | De Jager et al. |
| 9,565,476 B2 | 2/2017 | Bakke |
| 9,607,537 B2 | 3/2017 | Fleck et al. |
| 2003/0020671 A1 | 1/2003 | Santoro et al. |
| 2005/0149964 A1 | 7/2005 | Thomas et al. |
| 2005/0281099 A1 | 12/2005 | Lovett |
| 2006/0120624 A1 | 6/2006 | Jojic et al. |
| 2006/0132474 A1 | 6/2006 | Lam |
| 2007/0083868 A1 | 4/2007 | Sankaranarayan et al. |
| 2007/0121012 A1 | 5/2007 | Hida et al. |
| 2007/0217130 A1 | 9/2007 | Eri |
| 2007/0226761 A1 | 9/2007 | Zalewski et al. |
| 2007/0285439 A1 | 12/2007 | King et al. |
| 2008/0066111 A1 | 3/2008 | Ellis et al. |
| 2008/0178217 A1 | 7/2008 | Ohno et al. |
| 2008/0263472 A1 | 10/2008 | Thukral et al. |
| 2009/0006191 A1 | 1/2009 | Arankalle et al. |
| 2009/0100462 A1 | 4/2009 | Park et al. |
| 2009/0132942 A1 | 5/2009 | Santoro et al. |
| 2009/0249393 A1 | 10/2009 | Shelton et al. |
| 2010/0020002 A1 | 1/2010 | Van Woudenberg et al. |
| 2010/0161754 A1 | 6/2010 | Davis |
| 2010/0231800 A1 | 9/2010 | White et al. |
| 2010/0260479 A1 | 10/2010 | Watanabe et al. |
| 2011/0115883 A1 | 5/2011 | Kellerman et al. |
| 2011/0249092 A1 | 10/2011 | Jacobs et al. |
| 2011/0298689 A1 | 12/2011 | Bhomer et al. |
| 2012/0054596 A1 | 3/2012 | Kroger et al. |
| 2013/0031582 A1 | 1/2013 | Tinsman et al. |
| 2013/0033477 A1 | 2/2013 | Sirpal et al. |
| 2013/0036235 A1 | 2/2013 | Lopez Garcia et al. |
| 2013/0091515 A1 | 4/2013 | Sakata et al. |
| 2013/0227393 A1 | 8/2013 | De Jager et al. |
| 2013/0279877 A1 | 10/2013 | Boak |
| 2014/0068695 A1 | 3/2014 | Shelton et al. |
| 2014/0078402 A1 | 3/2014 | Weast |
| 2014/0089107 A1 | 3/2014 | De Jager et al. |
| 2014/0173520 A1 | 6/2014 | Ogrinc et al. |
| 2014/0373027 A1 | 12/2014 | Pulapaka et al. |
| 2015/0082339 A1 | 3/2015 | Sumitomo et al. |
| 2015/0153910 A1 | 6/2015 | Wheeler et al. |
| 2015/0371613 A1 | 12/2015 | Patel et al. |
| 2016/0093239 A1 | 3/2016 | Wang et al. |

US 10,212,489 B2

VIDEO ADVERTISING SYSTEM

CROSS-REFERENCE TO RELATED APPLICATIONS

The present application is a continuation of U.S. patent application Ser. No. 15/004,300, filed on Jan. 22, 2016, which is a non-provisional of U.S. Provisional Application Ser. No. 62/106,565, filed Jan. 22, 2015, the entire disclosure of each of which is hereby incorporated by reference herein.

BACKGROUND

The present disclosure relates to digital video advertising. In particular, the present disclosure relates to systems, components, and methodologies for selecting, delivering, displaying, and collecting and analyzing metrics associated with digital video advertising.

SUMMARY

According to the present disclosure, systems, components, and methodologies are provided for selecting, delivering, displaying, and collecting and analyzing metrics associated with digital video advertising.

In illustrative embodiments, a video advertising system selects a video advertisement for display on an end user device based not only on targeting criteria exchanged with a demand side platform ("DSP"), but also based on targeting criteria that specifies attributes measured on an end user device. The video advertising system includes software running on the end user device capable of measuring properties of the end user device, such as hardware properties (type of CPU, WiFi connectivity, audio connectivity, etc.), software properties (measured video player size, measured player resolution, etc.), user-specific properties (user latitude and longitude, whether the user has scrolled away from the video frame, etc.), and other properties to be discussed below. The software running on the end user device selects a video advertisement having targeting criteria that aligns with the measured properties of the end user device.

The video advertising system can select advertisements most suitable for the actual environment in which the video advertisement will be played by using targeting criteria that specifies measured properties of an end user device. This enables the video advertising system to target advertisements based on end user device properties unavailable with conventional advertising systems. Moreover, even where conventional systems purport to select advertisements based on certain end user device properties, such systems typically rely on properties as they are reported. Reported properties may be limited, unavailable, erroneous or even fraudulent. By measuring properties directly from an end user device, the video advertising system is not susceptible to erroneous or fraudulent reporting and can generate information that would be otherwise unavailable.

By way of example, an end user device property relevant to video advertisers is video player size. The provider of the video advertising space may report the video player size to be large, either fraudulently or based on the provider's subjective measure of size. A video advertising system in accordance with the present disclosure measures the actual, physical size of the video player at the time the intended viewer of the advertisement plays the video. The measured video player size represents a more accurate measure of the impact of the advertisement on the intended viewer than the reported player size.

In illustrative embodiments, the video advertising system provides accurate measurements of the viewability of video advertisements. When a user views a content page having a video advertisement, the user may scroll away from the video advertisement, obscuring some or all of the video. Viewability measurements can be valuable to advertisers interested in assessing the effectiveness of advertisements. In accordance with the present disclosure, the video advertising system may measure what percentage of a video is viewable to a user at any given time.

The video advertising system can accurately measure viewability even in environments where direct, deterministic viewability measurements are not available, such as when the video advertising is rendered within an unFriendly iFrame. The video advertising system can measure viewability using statistical inferences that are formed based on differences in how the end user device responds to processor-based operations (e.g., blurring, dithering, etc.) performed on viewable portions of the video as compared to non-viewable portions of the video.

By providing accurate viewability measurements even when direct viewability measurements are not available, the video advertising system provides improved feedback to advertisers regarding the effectiveness of their advertising campaigns. Moreover, the video advertising system can take actions on the end user device based on the viewability measurements. For example, the video advertising system may pause the video when a predetermined portion of the video is not viewable (e.g., as a user scrolls away from the video), and may resume the video when a sufficient portion of the video is again viewable (e.g., as a user scrolls back).

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1A:
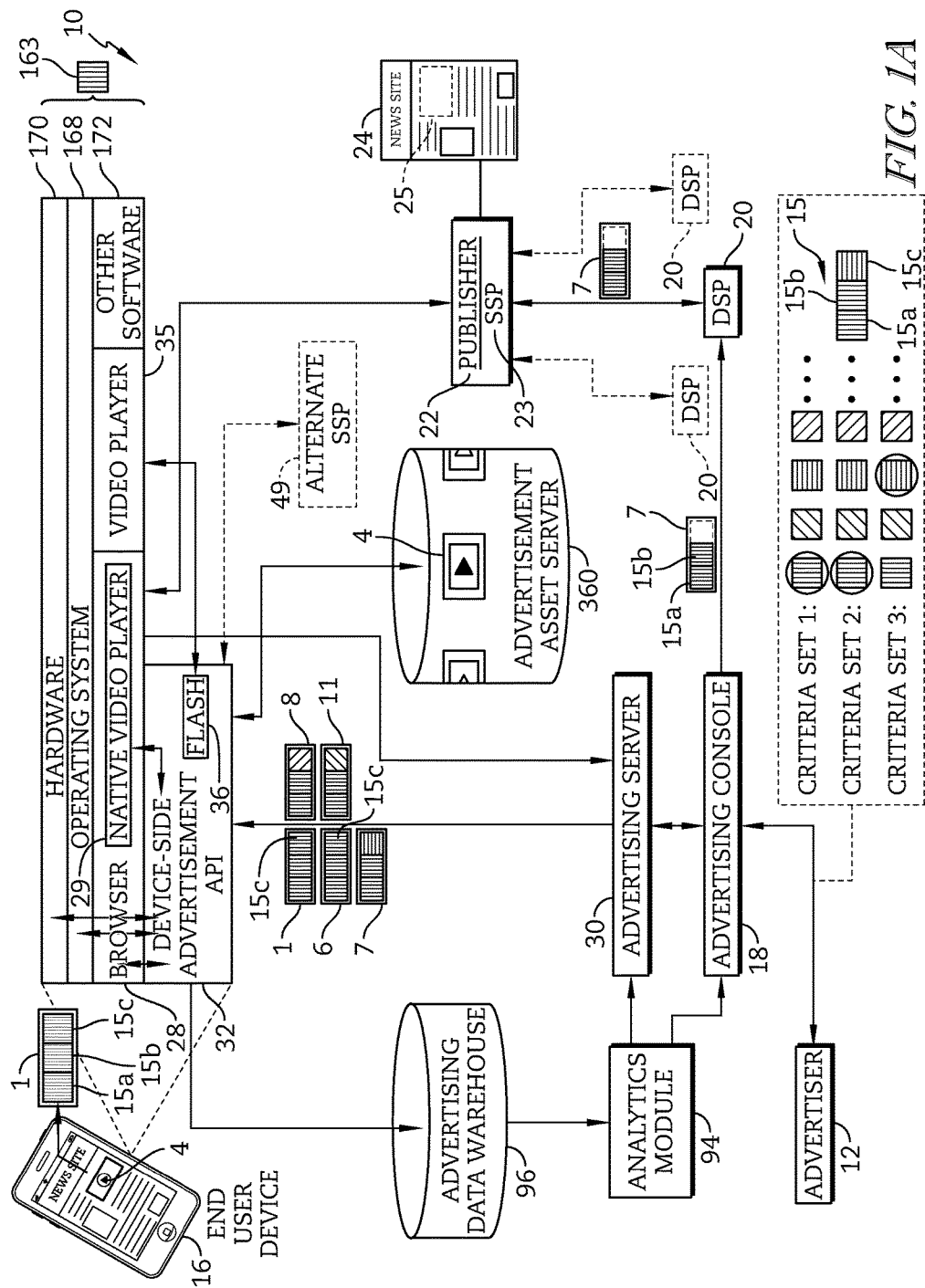
FIG. 1A is a diagrammatic view of a video advertising system 10 in accordance with the present disclosure for selecting, delivering, displaying, and collecting and analyzing metrics associated with digital video advertising.

By way of overview, FIG. 1A shows a video advertising system 10 that enables display of a video advertising campaign 1 on an end-user device 16. Advertising console 18 creates advertising campaigns 1-10 (shown in FIG. 2), from which a particular advertising campaign 1 may be selected for display on end-user device 16. Advertising campaigns 1-10 may include one or more video advertisements, targeting criteria 15 setting forth attributes used during advertisement selection, and other parameters.

FIG. 1A suggests that advertising console 18 enables advertiser 12 to select attributes for three sets of targeting criteria 15, labelled as Criteria Set One 15a, Criteria Set Two 15b, and Criteria Set Three 15c, respectively. Criteria Set One 15a may include advertisement selection criteria supported by a DSP 20 (to be discussed below). By way of example, Criteria Set One 15a may include specifications on a budget for an advertising campaign, types of devices (desktop, laptop, mobile, etc.) suitable for an advertising campaign, or a video player size (as declared by a publisher) suitable for an advertising campaign. Criteria Set Two 15b may include a list of URLs acceptable to advertiser 12 for showing a video advertisement. For example, Criteria Set Two 15b may include URLs on which advertiser 12 has previously advertised or URLs having content similar to where advertiser 12 has previously advertised. Criteria Set Three 15c may include attributes related to measured properties of end user device 16. For example, Criteria Set Three 15c may include specifications on types of devices, device bandwidth capabilities, or device battery levels that are suitable for an advertising campaign.

Attributes for Criteria Set One 15a, Criteria Set Two 15b, and Criteria Set Three 15c will be discussed in more detail below. Although three sets of criteria are discussed in the present disclosure, the present disclosure encompasses targeting criteria setting forth any number of attributes organized into any suitable number of criteria sets.

In the illustrated example, advertising console 18 is used to create an advertising campaign 7. Advertising console 18 enables advertiser 12 to select targeting criteria 15 by selecting attributes for Criteria Set One 15a (depicted by vertical lines), attributes for Criteria Set Two 15b (depicted by vertical lines), and attributes for Criteria Set Three 15c (depicted by horizontal lines). For ease of explanation, possible selections for Criteria Set One 15a, Criteria Set Two 15b, and Criteria Set Three 15c are graphically depicted by boxes filled with lines of varying orientation, including vertical lines, angled lines, and horizontal lines.

After targeting criteria 15 have been selected, advertising console 18 sends advertising campaign 7 to DSP 20. However, advertising console 18 sends only targeting Criteria Set One 15a and Criteria Set Two 15b to DSP 20 for use in advertisement selection by DSP 20. Criteria Set Three 15c is reserved for later processing by video advertising system 10, as will be explained below.

DSP 20 receives a request for a bid for video advertising from a content publisher 22 and/or a supply side platform ("SSP") 23 associated with publisher 22. Publisher 22 manages content 24, such as a webpage, to be published to an end user device 16. Content 24 includes a location 25 suitable for video advertising, and publisher 22 solicits bids (either directly or via SSP 23) for showing a video advertisement in location 25. Publisher 22 and/or SSP 23 may solicit bids from one or more DSPs 20. In response, DSP 20 may submit bids for advertising campaign 7.

Publisher 22 and/or SSP 23 may solicit bids by indicating specifications on attributes for Criteria Set One 15a and Criteria Set Two 15b. DSP 20 may select advertising campaigns for which to submit bids by identifying advertising campaigns having matching attributes for Criteria Set One 15a and Criteria Set Two 15b. Where multiple advertising campaigns satisfy the relevant attributes for Criteria Set One 15a and Criteria Set Two 15b, DSP 20 may implement any suitable methodology to select one. In this example, advertising campaign 7 has suitable attributes for Criteria Set One 15a and Criteria Set Two 15b for the requested bid, and DSP 20 submits a bid for advertising campaign 7.

In this illustration, publisher 22 and/or SSP 23 accept the bid submitted by DSP 20 for advertising campaign 7. Publisher 22 publishes content 24 to browser 28, which renders content 24 on end user device 16. Publisher 22 also notifies browser 28 of winning advertising campaign 7, including a notification of an advertisement server 30 that can serve winning advertising campaign 7 to end user device 16. Browser 28 may then query advertisement server 30 for the video advertisement.

Video advertising system 10 can find advertising campaigns even more likely to yield positive outcomes for advertiser 12 than wining advertising campaign 7. Rather than simply serving winning advertising campaign 7, video advertising system 10 considers additional advertising campaigns 1, 6, 8, 11 that have attributes for Criteria Set One 15a and Criteria Set Two 15b similar to those of winning advertising campaign 7. As a result, additional advertising campaigns 1, 6, 8, 11 are consistent with criteria used by DSP 20 to select advertising campaign 7. However, video advertising system 10 may additionally factor end user device properties 163 to select an advertising campaign 1, 6, 7, 8, 11 that is most likely to yield positive outcomes for advertiser 12 on end user device 16.

To factor end user device properties 163, video advertising system 10 measures and compares end user device properties 163 to attributes in Criteria Set Three 15c for advertising campaigns 1, 6, 7, 8, 11. As mentioned, Criteria Set Three 15c includes attributes related to measured properties of end user device 16. Video advertising system 10 includes a device-side advertisement API 32, which operates on end user device 16 and can directly measure end user device properties 163. Video advertising system 10 may compare measured end user device properties 163 to Criteria Set Three 15c for advertising campaigns 1, 6, 7, 8, 11 and perform an additional round of advertisement selection, beyond that performed by DSP 20.

Figure 6:
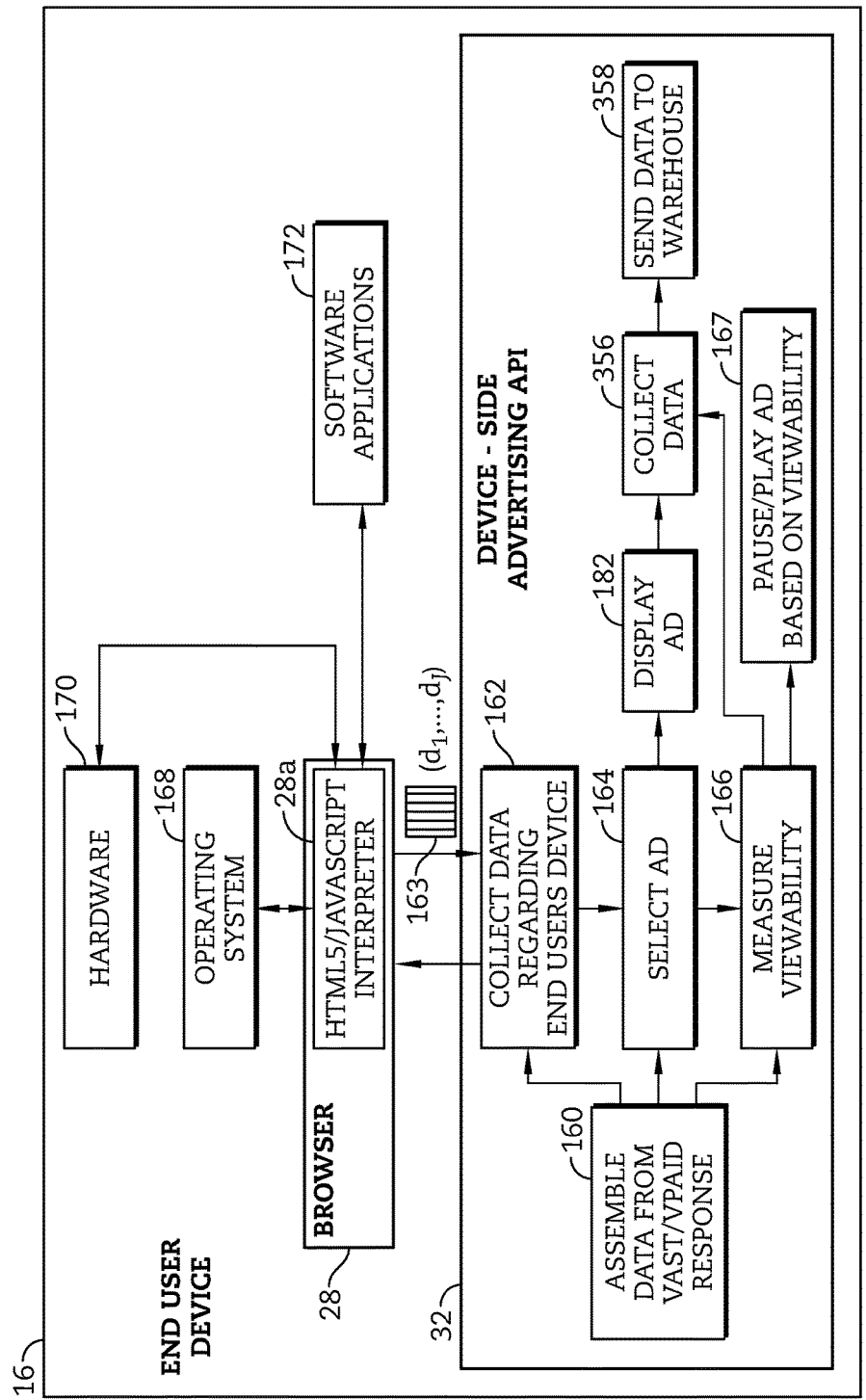
FIG. 6 is a diagrammatic view of operations of a device-side advertisement application programming interface (API) in accordance with the present disclosure, showing that the device-side advertisement API generates several processes that operate in parallel, including a data collecting process, an advertisement selecting process, and a viewability measuring process.

To enable device-side advertisement API 32 to run on end user device 16, advertisement server 30 transmits device-side advertisement API 32 (or a reference to device-side advertisement API 32) to end user device 16. Device-side advertisement API 32 then initiates its operations on end user device 16, as illustrated in FIG. 6. Advertisement server 30 may then transmit to device-side advertisement API 32 information associated with winning advertising campaign 7 as well as related advertising campaigns 1, 6, 8, 11.

Device-side advertisement API 32 determines which of advertising campaigns 1, 6, 7, 8, 11 have attributes most suitable for use on end user device 16. The information transmitted to device-side advertisement API 32 includes attributes for Criteria Set Three 15c for advertising campaigns 1, 6, 7, 8, 11. Device-side advertisement API 32 compares attributes for Criteria Set Three 15c for each advertising campaign 1, 6, 7, 8, 11 to measured properties 163 of end user device 16, and determines which of advertising campaigns 1, 6, 7, 8, 11 have attributes for Criteria Set Three 15c most suitable for use on end user device 16.

Examples of attributes for Criteria Set Three 15c will be discussed in more detail below, but may include measured video player size, measured bandwidth, WiFi connectivity, and geographic location of end user device 16, to name a few. For example, if advertiser 12 values a high click-through rate for a particular advertising campaign, advertiser 12 may prefer that such an advertising campaign be shown only on end user video players that are quantitatively large, in that they have a physical size measurement exceeding a predetermined threshold, because users are more likely to click on advertisements shown on large video players.

As another example, brand advertisers may place value on the quality of an end user's experience with interactions that end users have with the brand advertisers. A brand advertiser may want its video advertisements to be delivered to a viewer when the viewer's device is connected using a high bandwidth connection, such as WiFi, which promotes a smooth and disruption-free advertisement delivery. By employing attributes for Criteria Set Three 15c, video advertising system 10 can measure whether end user device 16 has a high bandwidth, WiFi connection.

As yet another example, advertisers may value information regarding geographic location of video advertisement viewers. An automobile dealer, for example, may want to target users that are within a predetermined distance (e.g., ten miles) of their dealership at the time they view the advertisement. Advertisers may also value historical geographic location information. The automobile dealer may, for example, want to include in its target audience viewers that were within a predetermined distance a predetermined number of times within a predetermined time window (e.g., within a ten mile radius five or more times in the last fifteen days). Video advertising system 10 measures geographic information, such as the latitude and longitude of end user device 16, which may be obtained by querying the global positioning system of end user device 16 at the time of advertisement delivery. Geographic information may be stored on end user device 16 by video advertising system 10 for later use as historical geographic information. Video advertising system 10 may also provide a confidence interval for the accuracy of its geographic measurements. The geographic locations of viewers that view a video advertisement, the historical geographic behavior of individuals that have viewed the video advertisement in the past, and measurements of viewer interactions with the video advertisement provides detailed and valuable insights into the interests of the viewers.

In this example, a set of measured end user device properties 163 are graphically depicted for ease of explanation by a box containing vertical lines. Advertising campaigns 1 and 6 have attributes for Criteria Set Three 15c that match measured end user device properties 163, suggested by boxes containing vertical lines for each. Winning advertising campaign 7 has attributes for Criteria Set Three 15c that do not match, suggested by a differently styled box, containing horizontal lines. As a result, device-side advertisement API 32 selects either advertising campaign 1 or 6, rather than winning advertising campaign 7. Using a scoring methodology to be discussed below, device-side advertisement API 32 may select advertising campaign 1 over advertising campaign 6, and render advertising campaign 1 at location 25 of content 24. Thus, in this example, video advertising system 10 selected an advertising campaign 1 for display on end user device 16 that is more suitable than the winning advertising campaign 7 selected by DSP 20.

Figure 1B:
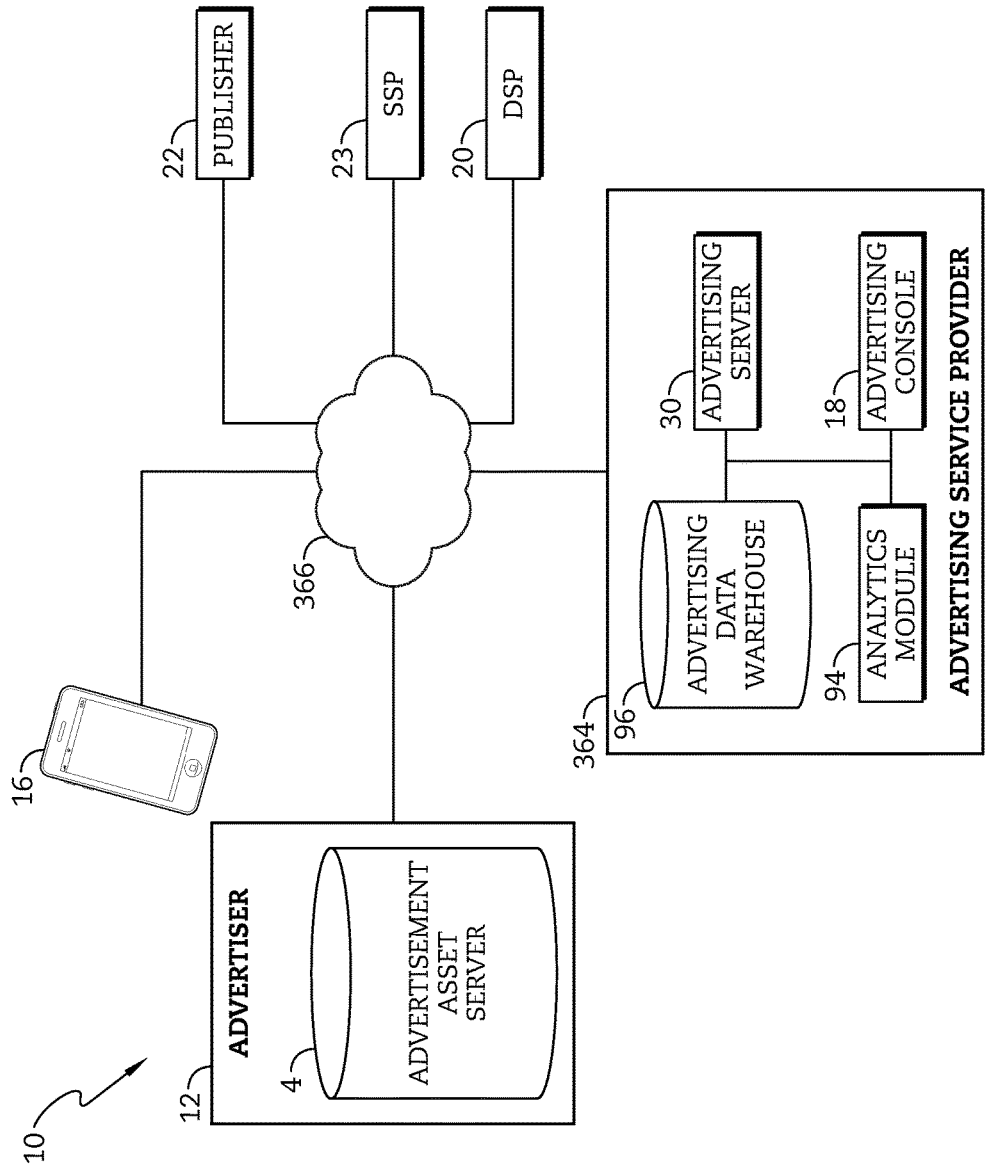
FIG. 1B is a diagrammatic view of an exemplary deployment of video advertising system 10 of FIG. 1A in accordance with the present disclosure.

FIG. 1B shows an exemplary deployment of video advertising system 10 in accordance with the present disclosure. As illustrated, advertising server 30, advertising console 18, analytics module 18, and advertising data warehouse 86 may be hosted by an advertising service provider 364. Thus, advertising server 30, advertising console 18, analytics module 18, and advertising data warehouse 86 may all be provided at a common location or as part of a common local area network, though in other implementations may be provided separately. In an example embodiment, the advertising console 18, analytics module 18, and advertising data warehouse 86 may be included in the advertising server 30. Advertiser 12 may host advertisement asset server 4. Advertising service provider 364, advertiser 12, end user device 16, publisher 22, SSP 23, and DSP 20 may all be in communication through network 366, such as the Internet, wide area networks, local area networks, or combinations thereof.

Figure 2:
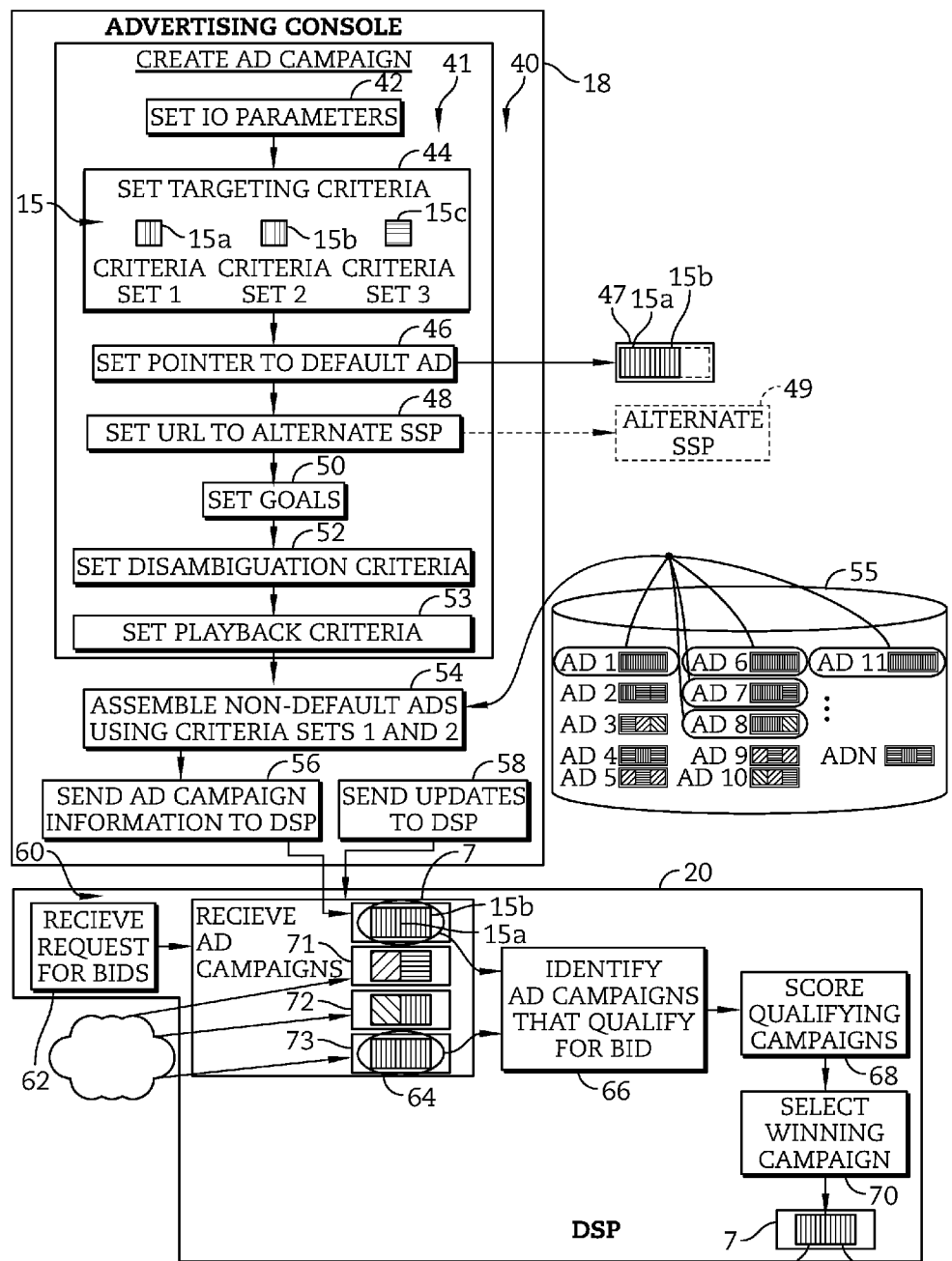
FIG. 2 is a diagrammatic view of an advertising campaign setup process performed by advertising console, and an advertising campaign selection process performed by a demand side platform in accordance with the present disclosure.
Figure 3:
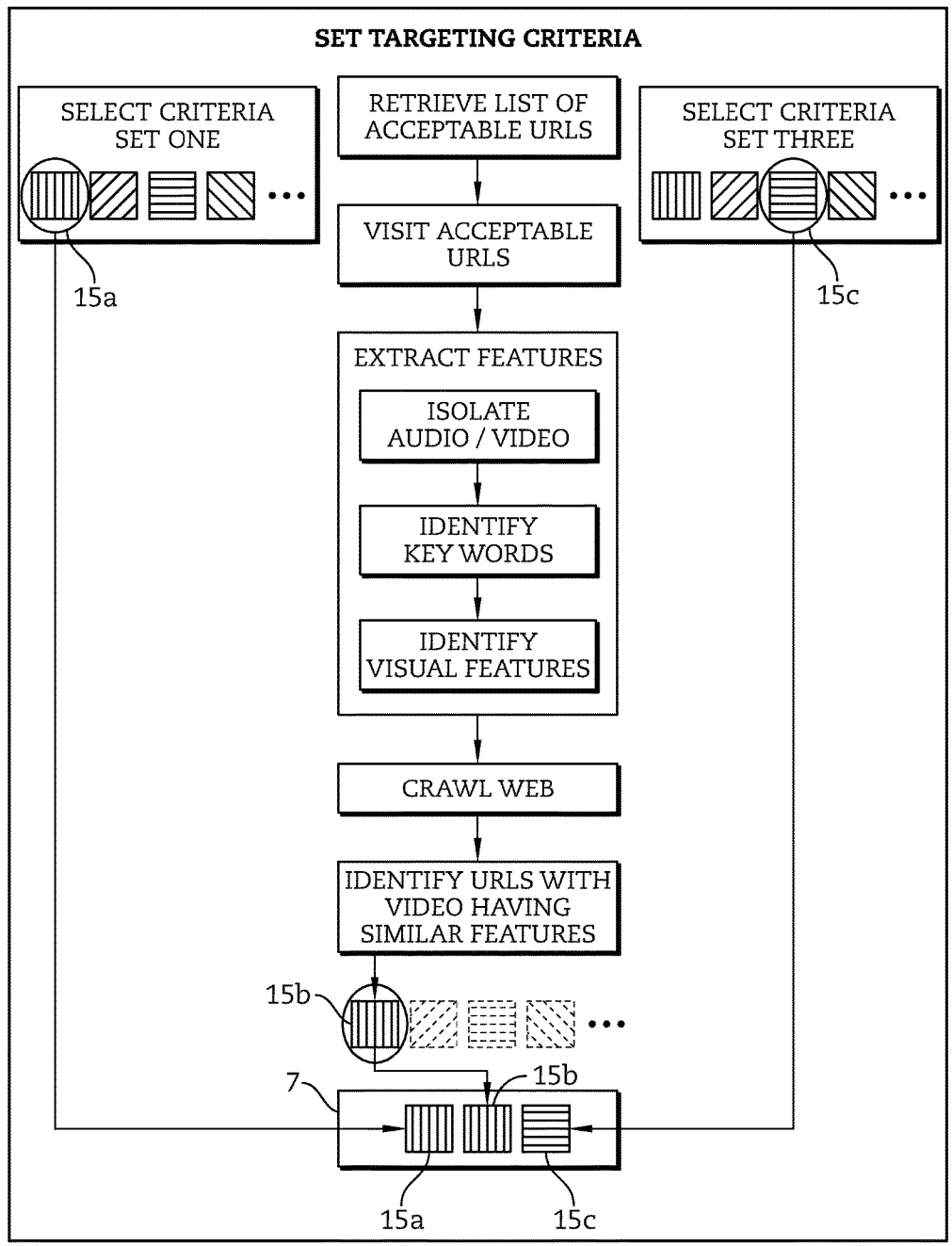
FIG. 3 is a diagrammatic view of a target criteria setting operation of FIG. 2, illustrating three sets of exemplary targeting criteria and illustrating how targeting criteria may be set in accordance with the present disclosure.
Figure 4:
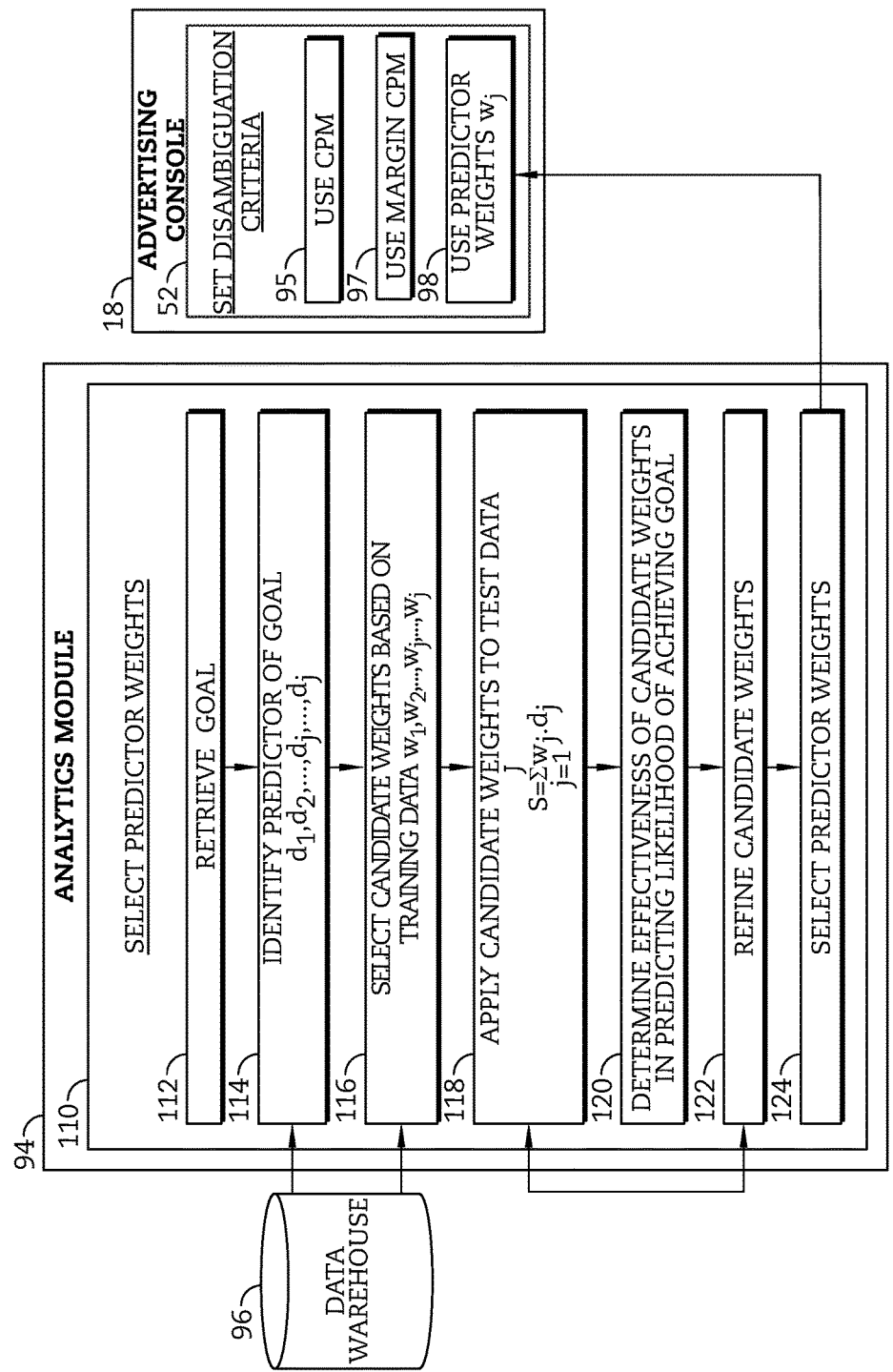
FIG. 4 is a diagrammatic view of a disambiguation criteria setting operation of FIG. 2, illustrating how disambiguation criteria may be set in accordance with the present disclosure.
Figure 5:
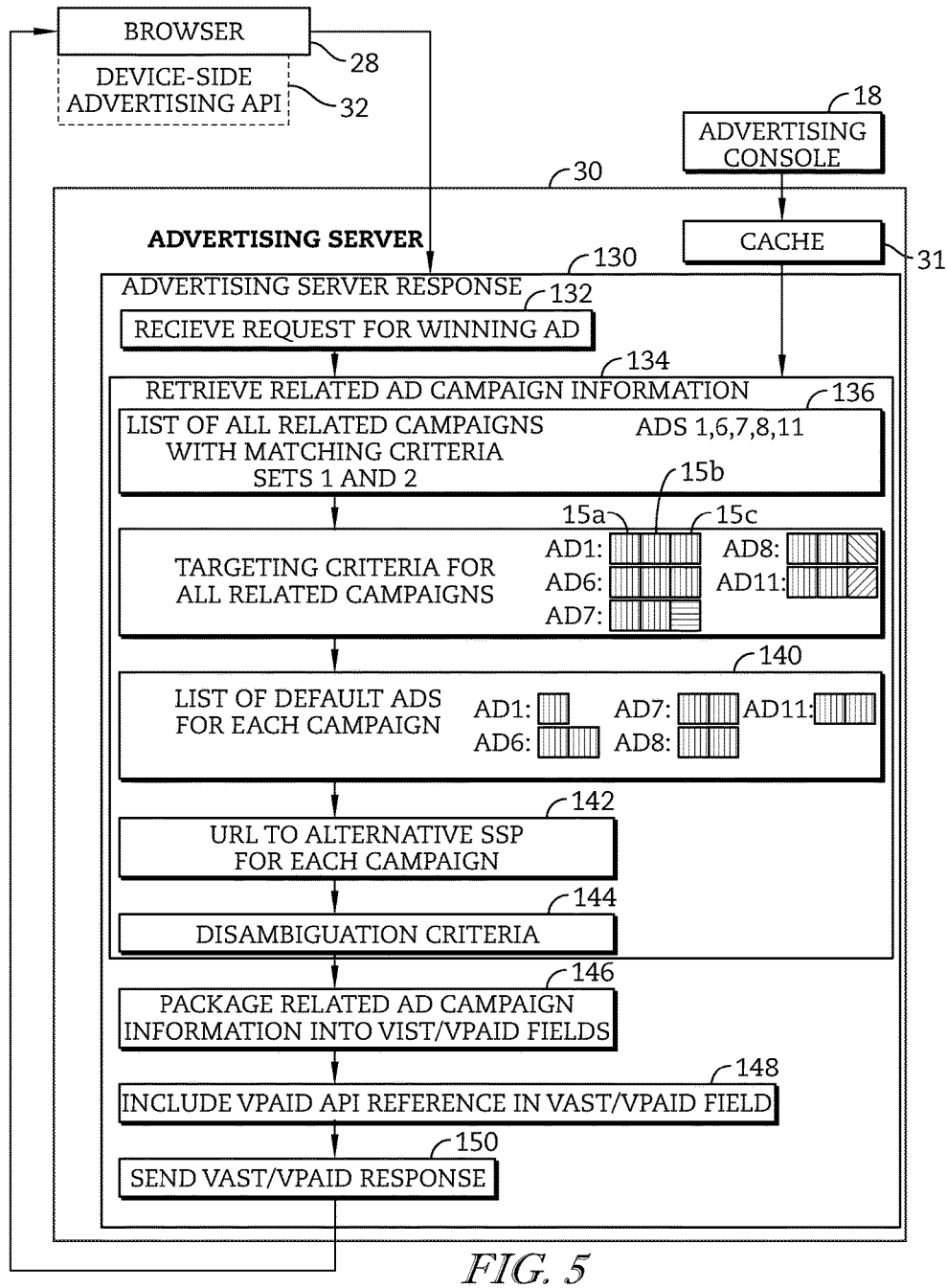
FIG. 5 is a diagrammatic view of an advertisement server response process in accordance with the present disclosure, illustrating how an advertisement server may respond to a query for an advertisement after an advertising campaign associated with the advertisement server is selected by a publisher or supply side platform as a winning advertising campaign.

FIGS. 2-14 illustrate systems, components, and methodologies of various aspects of video advertising system 10. By way of overview, FIGS. 2-4 illustrate systems, components, and methodologies by which an advertising campaign 7 may be created by advertising console 18, and by which advertising campaign 7 may be selected by DSP 20 as a winning advertising campaign. FIG. 5 illustrates how advertisement server 30 may respond to a query for an advertisement after an advertising campaign associated with advertisement server 30 is selected by a publisher 22/SSP 23. FIGS. 6-14 illustrate systems, components, and methodologies by which video advertising system 10 may measure properties of end user device 16, select an advertising campaign to display on end user device 16, measure viewability of video advertising being displayed on end user device 16, and collect and analyze data associated with video advertising being displayed on end user device 16.

As mentioned, FIGS. 2-4 illustrate systems, components, and methodologies by which advertising campaign 7 may be created by advertising console 18, and by which advertising campaign 7 may be selected by DSP 20 as a winning advertising campaign. Certain aspects of creating advertising campaign 7 are relevant to the manner by which DSP 20 selects winning advertising campaigns. Other aspects are not directly used by DSP 20, but will later be used by device-side advertisement API 32 to enable video advertising system 10 to provide device-side functionality.

FIG. 2 is a diagrammatic view of an advertising campaign setup process 40 performed by advertising console 18, and an advertising campaign selection process 60 performed by DSP 20 in accordance with the present disclosure. Advertising campaign setup process 40 creates, assembles, and sends advertising campaign 7 to DSP 20 through campaign creating operation 41, campaign assembling operation 54, campaign sending operation 56, and campaign updating operation 58. Campaign creating operation 41 includes several setting operations, including operation 42, in which advertising console 18 sets insertion order ("IO") parameters. Exemplary IO parameters may include a budget for the advertising campaign (e.g., $100,000), flight dates for the advertising campaign (e.g., Dec. 1, 2014-Dec. 31, 2014), desired cost-per-thousand-impressions for the advertising campaign ("CPM") (e.g., $15), frequency parameters for the advertising campaign (e.g., 3 displays per 24 hour period), and pacing for the advertising campaign (e.g., evenly pace throughout the campaign, display as soon as possible, etc.).

In operation 44, advertising console 18 sets targeting criteria 15, including Criteria Set One 15a, Criteria Set Two 15b, and Criteria Set Three 15c. As previously summarized, targeting criteria 15 may include attributes used during advertisement selection. Criteria Set One 15a may include attributes supported by DSP 20, Criteria Set Two 15b may include URLs acceptable to advertiser 12 for advertising campaign 7, and Criteria Set Three 15c may include attributes for measured properties of end user device 16. The manner by which targeting criteria 15 are set will be discussed in more detail below, in connection with FIG. 3.

In operation 46, advertising console 18 sets a pointer to a default advertisement 47. Default advertisement 47 is selected as an advertisement having Criteria Set One 15a and Criteria Set Two 15b that match Criteria Set One 15b and Criteria Set Two 15b of advertising campaign 7, as suggested by use of boxes having similarly styled vertical lines. However, default advertisement 47 does not necessarily have Criteria Set Three 15c that matches Criteria Set Three 15c of advertising campaign 7, and may not have any attributes for Criteria Set Three 15c at all. As will be explained below, in situations where device-side advertisement API 32 is unable to find advertising campaigns that have attributes for Criteria Set Three 15c suitable for end user device 16, device-side advertisement API 32 may instead select a default advertisement, such as default advertisement 47, for display on end user device 16.

In operation 48, advertising console 18 sets a URL to an alternate SSP 49 (shown in FIG. 1A). As will be explained below, in situations where device-side advertisement API 32 is unable to find any advertising campaigns that have attributes for Criteria Set Three 15c suitable for end user device 16, and is further unable to identify any default advertisements, device-side advertisement API 32 may decide to resell the advertising opportunity through alternate SSP 49.

In operation 50, advertising console 18 sets quantitative goals for achieving desired outcomes for advertising campaign 7. For example, a goal may be that a user clicks on video advertisement, that a video advertisement achieve a particular click-through rate ("CTR"), that a user watch a certain percentage of a video advertisement, that a user watch a certain percentage of a video advertisement with at least a certain percentage of that video advertisement viewable, or other outcomes.

Goals may be used to facilitate selection of disambiguation criteria, which are set in operation 52. As will be explained below, there may be instances in which device-side advertisement API 32, even after factoring Criteria Set Three 15c, has more than one advertising campaign suitable for display on end user device 16. Disambiguation criteria can be used to determine which of the qualifying advertisements should ultimately be selected. In certain implementations, disambiguation criteria are parameters that are used to score advertising campaigns, where the parameters are selected based on the goals specified during setting operation 50. The manner by which disambiguation criteria may be set is discussed in more detail in connection with FIG. 4, below.

In operation 53, advertising console 18 sets playback criteria. Playback criteria can set forth specifications on how video advertisements are played back on end user device 16. An exemplary playback criteria is "pause when not in view." If this playback criteria is set, a video advertisement being shown on end user device 16 may pause when a predetermined portion of the video is not within a viewable portion of a content page, and resume playing when a predetermined portion of the video is within the viewable portion of the content page. The "pause when not in view" playback criteria will be described in more detail in connection with FIGS. 13A-C. In exemplary implementations, playback criteria may be set at the same time or through a common interface as targeting criteria 15.

After campaign creating operation 41, advertising campaign setup process 40 proceeds to campaign assembling operation 54. In campaign assembling operation 54, advertising console 18 assembles all advertisements that have attributes for Criteria Set One 15a and Criteria Set Two 15b that match Criteria Set One 15a and Criteria Set Two 15b of advertising campaign 7. As previously explained, even if advertising campaign 7 were to be selected as a winning advertising campaign by DSP 20, device-side advertisement API 32 may consider additional advertising campaigns 1, 6, 8, 11. The additional advertising campaigns 1, 6, 8, 11 may be selected such that they are related to winning advertising campaign 7, in that they have the same or similar attributes for Criteria Set One 15a and Criteria Set Two 15b. The additional advertising campaigns 1, 6, 8, 11 are collected in assembling operation 54 so they can later be transmitted to device-side advertisement API 32.

Advertising campaign setup process may proceed to campaign sending operation 56, in which the advertising campaign 7 is sent to DSP 20. Campaign sending operation 56 may send only the advertising campaign information used by DSP 20. Thus, for example, sending operation 56 may send Criteria Set One 15a and Criteria Set Two 15b, but may not send Criteria Set Three 15c. If advertising campaign 7 is updated, campaign updating operation 58 may convey any changes to DSP 20. For example, advertising console 18 may generate a full update file reflecting changes to all advertising campaigns periodically (e.g., every hour) and place the update file on servers associated with DSP 20.

Advertising campaign selection process 60, performed by DSP 20, is also illustrated in FIG. 1A, and operates to select a winning advertising campaign. Advertising campaign selection process 60 begins with operation 62, in which DSP 20 receives requests for bids. For example, DSP 20 may receive requests from bids from publisher 22 and/or SSP 23. Advertising campaign selection process 60 proceeds to operation 64, in which DSP 20 receives advertising campaigns. In this illustration, DSP 20 receives advertising campaign 7 from advertising console 18, and also receives advertising campaigns 71, 72, 73 from other advertisers.

Advertising campaign selection process 60 proceeds to operation 66, in which DSP 20 identifies advertising campaigns that qualify for the bid. As illustrated, DSP 20 may select qualifying advertising campaigns by identifying those that have attributes for Criteria Set One 15a and Criteria Set Two 15b suitable for the bid being solicited. In this illustration, advertising campaigns 7 and 73 are identified by DSP 20 as having appropriate attributes for Criteria Set One 15a and Criteria Set Two 15b.

If DSP 20 identifies multiple advertising campaigns (e.g., advertising campaign 7 and advertising campaign 73 in this example), DSP 20 may proceed to operation 68, in which it applies a methodology to score identified advertising campaigns 7, 73. DSP 20 may proceed to operation 70, in which one of the advertising campaigns 7, 73 is selected based on their respective scores. In this example, advertising campaign 7 is selected as the winning campaign.

FIG. 3 is a diagrammatic view of target criteria setting operation 44 of FIG. 2, and illustrates targeting criteria 15 in accordance with the present disclosure. Criteria Set One 15a may include attributes used by DSP 20 to select advertising campaigns suitable for a given bid request. Examples of attributes in Criteria Set One 15b are set forth in the table below. These attributes may be set using advertisement console 18.

TABLE 1

Exemplary Criteria Set One attributes
Criteria Set One

| | |
|---|---|
| Budget | Specifications on budget for video advertising campaign |
| CPM | Specifications on cost-per-thousand-impressions for the advertising campaign |
| Frequency | Specifications on frequency of display of video advertisement, such as number of displays per hour, per day, etc. |
| Pace | Specifications on delivery pace of video advertisement, such as whether to pace evenly or deliver as soon as possible |
| Day parting (hours by day matrix) | Specification on the weekdays or hours within weekdays - e.g. a restaurant, specializing in lunch for office workers, may want to run a video advertisement from 11 AM-2 PM Monday through Friday only. |
| Geography | Specifications on location of end user device, such as IP address-based location, which may be based on country, state, zip, designated market area (DMA), metropolitan statistical area (MSA), etc. |
| Declared Inventory category | Specifications on the content category provided by the publisher of that content. |
| Declared Domain whitelist | Specifications on the list of domains where the advertiser wants to restrict their advertising |
| OS | Specifications on operating systems suitable for video advertisement (e.g., MacOS, Win7, iOS, Android, etc) |
| Device | Specifications on device type suitable for video advertisement (e.g., laptop, desktop, mobile, etc.) |
| Declared player size | Specifications on player size suitable for video advertisement, based on reported player size |
| SSP | Specifications on the Supply Side Platform vendor or list of allowed vendors |
| Pre-roll/Mid-roll/post-roll | Specifications on whether video should be pre-roll (displayed prior to rendering of publisher's video content), mid-roll (displayed in the middle of publisher's video content), or post-roll (displayed after publisher's video content has completed) |
| Audience segment | Specifications on the segments, as provided by the supply side platform or the demand side platform or another $3^{rd}$ party, that the advertiser wants to restrict the advertisement (e.g., only show ads to females 25-34 years old) |

In target criteria setting operation 44, advertisement console 18 enables advertiser 12 to set attributes for Criteria Set One 15a. FIG. 3 graphically depicts various possible sets of attributes for Criteria Set One 15a as boxes having lines of different orientations, and suggests that advertisement console 18 selects a particular set of attributes for Criteria Set One 15a.

Criteria Set Two 15b may also be used by DSP 20 during advertisement selection. Criteria Set Two 15b may include a list of URLs that are considered acceptable for display of video advertisements from advertiser 12. Attributes for criteria Set Two 15b can be generated by following a URL generation process 80. URL generation process 80 begins with operation 82, in which video advertising system 10 retrieves a list of known URLs that are suitable for advertising campaign 7.

In operation 84, video advertising system 10 visits each of the known URLs. In operation 86, video advertising system 10 extracts features from videos that are available at each of the known URLs. These features will be used in subsequent processing to identify other URLs that may also be suitable for advertising campaign 7. For example, if advertiser 12 is an automobile company, advertiser 12 may provide a list of known URLs that include video content pertaining to advertiser 12, such as video content about automobiles made by advertiser 12, video content about the class of automobiles made by advertiser 12, or the like. Such video content may include characteristic features, such as keywords or visual features. For example, such video content may include voice-over audio that says the name of automobiles manufactured by advertiser 12, or may include logos used for automobiles manufactured by advertiser 12.

To extract features, extracting operation 86 includes operation 87, which isolates an audio stream from a video stream. Extracting operation 86 then proceeds to operation 88, which identifies words being spoken as part of the audio stream using voice recognition techniques, and identifies keywords from among the identified words.

Extracting operation then proceeds to operation 89, which identifies visual features among the video, such as logos or faces, using object recognition, detection, and classification techniques.

URL generation process 80 then proceeds to operation 90, in which video advertising system 10 crawls through other Internet websites, identifies video content at those sites, and extracts audio and video features from the video content in a manner similar to extracting operation 86. Finally, in operation 92, video advertising system 10 identifies URLs having video with extracted features similar to the features extracted from video at the known URLs. The resulting list of URLs is assembled into Criteria Set Two 15b.

FIG. 3 graphically depicts various possible sets of acceptable URLs as boxes having lines of different orientations, and suggests that advertising console 18 selects a particular set as Criteria Set Two 15b.

As previously explained, Criteria Set Three 15c is not sent to DSP 20, but is instead used by device-side advertisement API 32 during later processing to select an advertising campaign. Examples of attributes in Criteria Set Three 15c are shown in the table below. Each of these attributes can be set by advertisement console 18 in consultation with advertiser 12.

TABLE 2

| Criteria Set Three attributes Criteria Set Two | |
|---|---|
| Measured Latitude and longitude | Specifications on the latitudinal and longitudinal position of end user device 16 |
| Measured player-size | Specifications on dimensions of video player on which video advertisement will be rendered |
| Measured player resolution | Specifications on resolution of video player on which video advertisement will be rendered |
| Detected parent URL or Domain list | Specifications on acceptable parent URL or domain lists for URL at which content 24 is being rendered |
| Detected WiFi connectivity | Specifications on whether end user device 16 has WiFi connectivity |
| Measured Bandwidth | Specifications on download speed of end user device 16 |
| Measured minimum battery level | Specifications on battery level of end user device 16 |
| Detected audio capabilities | Specifications on audio capabilities or settings on end user device 16 |
| Detected headphone connectivity | Specifications on whether a headphone is being used on end user device 16 |
| Play only when plugged in | Specifications on whether the advertisement can only played when the device is plugged in to an electric socket for charging the device. As video playback is demanding on end user device 16 resources, including its battery, end user device 16 may run out of battery during playback or its operating system may disrupt the video delivery to conserve battery power. Being plugged into the socket allows improved user experience, in that the video will be delivered with high quality without disruption. |
| Historical latitude and longitude information | Specifications on historical latitudinal and longitudinal position of end user device 16 |

FIG. 4 is a diagrammatic view of disambiguation criteria setting operation 52 of FIG. 2, illustrating how disambiguation criteria may be set in accordance with the present disclosure. As explained, disambiguation criteria may be used by device-side advertisement API 32 in the event that multiple advertising campaigns are suitable for end user device 16, even after considering their respective attributes for Criteria Set Three 15c. As shown in FIG. 4, disambiguation criteria setting operation 52 includes three alternatives. In alternative 95, advertising console 18 may select CPM as the disambiguation criteria. In this scenario, device-side advertisement API 32 would select from among multiple suitable advertisements based solely on which has the most favorable CPM metrics. In alternative 97, advertising console 18 may select margin CPM as the sole disambiguation criteria. Margin CPM may refer to the portion of CPM received by a particular entity that facilitates video advertisement selection and distribution. Finally, in alternative 98, advertising console 18 may use predictor weights $w_j$ as the disambiguation criteria.

Predictor weights $w_j$ may be used to score advertising campaigns. As will be explained in more detail below, when device-side advertisement API 32 is choosing from among multiple advertising campaigns, device-side advertisement API 32 may score the advertising campaigns and select the highest scoring advertising campaign. Predictor weights $w_j$ may drive the scoring methodology to increase the likelihood that the highest scoring advertising campaign will achieve a certain goal for advertiser 12.

Predictor weights $w_j$ may be selected by analytics module 94 (shown in FIG. 1A) according to a predictor weight selection process 110, shown in FIG. 4. Predictor weight selection process 110 begins with operation 112, in which a goal is retrieved. As previously explained, the goal for an advertising campaign may be specified according to goal setting operation 50, shown in FIG. 2, and may be that a user clicks on video advertisement, that a video advertisement achieve a particular click-through rate ("CTR"), that a user watch a certain percentage of a video advertisement, that a user watch a certain percentage of a video advertisement with at least a certain percentage of that video advertisement viewable, or other desired outcomes.

In operation 114, analytics module 94 identifies predictors $d_j$ for the goal. Predictors $d_j$ may include properties that impact how likely an advertising campaign is to achieve the goal on a given end user device. In exemplary implementations, the attributes selected as predictors include attributes for Criteria Set Three 15c. For example, where the goal is to achieve a particular click-through rate, advertising campaigns having an attribute for Criteria Set Three 15c specifying high bandwidth connections may be more likely to achieve the goal, because users of high bandwidth devices may be more likely to click on video advertisements. If a particular attribute is not in a numerical format, analytics module 94 may map the attribute to a numerical scale as to arrive at a set of numerical predictors $d_j$.

By way of example, the bandwidth attribute may take on certain discrete, categorical values, such as "high", "medium", or "low". High may be coded as a numerical 1, medium may be coded as a numerical 0, and low may be coded as a numerical −1. In exemplary implementations, numerical values are assigned categorical values such that they sum to zero (e.g., −1+0+1=0). For computational efficiency, the categorical value taking on a numerical value of 0 (e.g., "medium" in this example) need not be considered during modeling operations.

In operation 116, analytics module 94 selects a candidate predictor weight $w_j$ for each predictor $d_j$ based on training data. Predictor weights $w_j$ may be selected in accordance with machine learning techniques, and may be selected such that predictors more strongly correlated with a likelihood that a video advertisement will achieve the goal are assigned higher weights. Training data may include actual historical measurements for how video advertising on particular end user devices having particular predictor sets $d_j$ performed with respect to the goal. As shown in FIG. 4, training data may be drawn from an advertising data warehouse 96 (shown in FIG. 1A).

In operation 118, analytics module 94 applies candidate predictor weights $w_j$ to test data, which may also be drawn from advertising data warehouse 96. Test data may also include actual historical measurements for how video advertising on particular end user devices having particular predictor sets $d_j$ performed. In an exemplary implementation, each predictor $d_j$ is multiplied by a corresponding candidate predictor weight $w_j$, and the resulting products are summed to yield a score S for the advertising campaign.

In operation 120, analytics module 94 determines whether the candidate predictor weights $w_j$ are effective in predicting the likelihood that a video advertising campaign will achieve the goal. This determination may assess whether computed scores S for test advertising campaigns sufficiently correlate with whether the test advertising campaigns achieved the goal during past deployments.

If operation 120 determines that candidate predictor weights $w_j$ are not sufficiently effective, analytics module 94 may proceed to operation 122, in which candidate predictor weights $w_j$ may be refined in accordance with machine learning techniques. Predictor weight selection process 110 may iterate through operations 118, 120, 122 until candidate predictor weights $w_j$ are sufficiently effective. Predictor weight selection process 110 may conclude with operation 124, in which final candidate predictor weights $w_j$ are selected and transmitted to advertising console 18 as disambiguation criteria.

Thus, FIGS. 2-4 illustrated systems, components, and methodologies by which advertising campaign 7 may be created by advertising console 18, and by which advertising campaign 7 may be selected by DSP 20 as a winning advertising campaign.

Referring again to FIG. 1A, DSP 20 may notify browser 28 that advertising campaign 7 was selected for location 25 of content 24. Once browser 28 receives notification of advertising campaign 7, browser 28 queries advertisement server 30 for the advertisement that should be rendered at location 25. FIG. 5 shows an advertisement server response process 130 performed by advertisement server 30 in response to receiving a query from browser 28.

By way of overview, advertisement server response process 130 transmits a Video Ad Serving Template ("VAST")/Video Player-Ad Interface Definition ("VPAID") response (i.e., a response compliant with any suitable version of VAST and/or VPAID specifications). Rather than directly referencing a video advertisement to display in the VAST/VPAID response, advertisement server 30 transmits a reference to device-side advertisement API 32, which begins operating on end user device 16. In exemplary implementations, the reference to device-side advertisement API 32 is a URL to an XML resource available on a server, with the XML resource containing a reference URL to device-side advertisement API 32. Device-side advertisement API 32 may be any suitable instruction set that browser 28 can execute, such as a JavaScript file. In the case where device-side advertisement API 32 will execute in a flash environment, device-side advertisement API 32 may be an ActionScript file.

Advertisement server 30 transmits to device-side advertisement API 32 various information previously established by advertising console 18 (as shown in FIG. 2), so that device-side advertisement API 32 can select an advertising campaign to display on end user device 16.

Advertisement server response process 130 begins with operation 132, in which advertisement server 30 receives a request for a winning advertisement from browser 28. In operation 134, advertisement server 30 retrieves information pertaining to winning advertising campaign 7 and other related advertising campaigns. The retrieved advertising campaign information was previously set by advertising console 18, as described in connection with FIG. 2. In certain implementations, advertisement server 30 may retrieve the advertising campaign information directly from advertising console 18 in response to the query from browser 28. In the illustrated implementation, however, advertisement server 30 includes a cache 31, which periodically downloads all available advertising campaign information from advertising console 18. A benefit of using cache 31 is that pertinent advertising campaign information is readily available for quick retrieval by advertisement server 30 in response to receiving a query from browser 28.

FIG. 5 illustrates exemplary advertising campaign information retrieved by advertisement server 30. Advertisement server 30 may retrieve a list of all related advertising campaigns 136, which includes advertising campaigns that have attributes in Criteria Set One 15a and Criteria Set Two 15b that match corresponding attributes in Criteria Set One 15a and Criteria Set Two 15b for winning advertising campaign 7. As previously explained, assembling operation 54 (shown in FIG. 2) assembles related advertising campaigns 136, which in this example includes advertising campaigns 1, 6, 7, 8, and 11.

Advertisement server 30 may also retrieve targeting criteria 15 for all related advertising campaigns 136. As previously explained in connection with FIGS. 2 and 3, targeting criteria 15 may be established for advertising campaign 7, and similar operations may be followed for each of the related advertising campaigns 136. FIG. 5 illustrates different sets of targeting criteria 15 by way of boxes with lines of varying orientation. For example, advertising campaign 1 includes a set of attributes for Criteria Set One 15a, a set of attributes for Criteria Set Two 15b, and a set of attributes for Criteria Set Three 15c, each represented by boxes with lines having vertical orientation.

Advertisement server 30 may also retrieve a list of default advertisements 140 for each of the related advertising campaigns 136. Operation 46 of FIG. 2 illustrated how a pointer to a default advertisement 47 could be set for advertising campaign 7, and a similar operation may be followed for each of the related advertising campaigns 136.

Advertisement server 30 may also retrieve a URL 142 to an alternative SSP, which was set in operation 48 of FIG. 2.

Finally, advertisement server 30 may retrieve disambiguation criteria 144, which was established in disambiguation criteria setting operation 52, illustrated in FIGS. 2 and 4.

Advertisement server 30 proceeds to packaging operation 146, in which the retrieved advertising campaign information is packaged into fields of a VAST/VPAID-compliant response. In operation 148, advertisement server 30 also includes device-side advertisement API 32 into a field of the VAST/VPAID-compliant response. By way of example, the device-side advertisement API 32 may be referenced in the "Media File" field of the VAST/VPAID-compliant response, and the related advertising campaign information may be placed in any other suitable fields of the VAST/VPAID-compliant response. Device-side advertisement API 32 may be programmed with correlation tables indicating which type of related advertising campaign information is stored in which VAST/VPAID field, enabling device-side advertisement API 32 to parse and interpret the VAST/VPAID-compliant response.

In operation 150, advertisement server 30 sends the assembled VAST/VPAID-compliant response to browser 28. Browser 28 follows the reference to device-side advertisement API 32. Device-side advertisement API 32 may then begin operating on end user device 16 as a programmatic interface between advertisement server 30 and browser 28, as suggested in FIG. 5.

FIG. 6 illustrates operations of device-side advertisement API 32 in accordance with the present disclosure. Once device-side advertisement API 32 has been initiated, device-side advertisement API 32 performs assembling operation 160, in which device-side advertisement API 32 parses, interprets, and organizes data transmitted through the VAST/VPAID-compliant response from advertisement server 30.

Device-side advertisement API 32 may then generate several processes that operate in parallel, including a data collecting process 162, an advertisement selection process 164, and a viewability measuring process 166. Data collecting process 162 collects data regarding end user device 16, advertisement selection process 164 selects an advertising campaign for display on end user device 16, and viewability measuring process 166 measures what portion of a video advertisement is viewable to a user of end user device 16. By generating these processes in parallel, device-side advertisement API 32 achieves enhanced speed and responsiveness.

To perform data collecting process 162, device-side advertisement API 32 may include program code that invokes functionality of browser 28 to retrieve end user device properties 163. For example, device-side advertisement API 32 may include program code written in HTML5 and/or JavaScript that is interpreted by an HTML5/JavaScript interpreter 28*a* of browser 28. The program code may invoke functionality of browser 28 that can retrieve end user device properties 163. By way of example, end user device 16 may include an operating system 168 that exposes APIs accessible by browser 28 to obtain various system properties, such as battery level of end user device 16, WiFi connectivity of end user device 16, audio or video playback settings of end user device 16, and other properties. Alternatively, browser 28 may access hardware 170 (or software-accessible interfaces exposed by hardware 170, such as device drivers) to obtain end user device properties. In still other alternatives, browser 28 may access APIs exposed by other software applications 172 loaded on end user device to obtain end user device properties 163. Generally, end user device properties 163 may include any hardware-measurable or software-measurable properties of end user device 16, and all such properties are within the scope of the present disclosure.

Examples of end user device properties 163 collected during data collecting process 162 may include properties corresponding to attributes for Criteria Set Three 15*c*, such as those set forth in Table 3 below. End user device properties 163 are graphically depicted in FIG. 6 as a box with vertically oriented lines, and may be denoted as $d_1, \ldots, d_f$. Browser 28 transmits end user device properties 163 to device-side advertisement API 32.

TABLE 3

| Measured end user device properties |
| --- |
| Measured latitude and longitude |
| Measured video player-size |
| Measured video player resolution |
| Detected parent URL or Domain list for content 24 |
| Detected WiFi connectivity |
| Measured Bandwidth |
| Measured battery level |
| Detected audio capabilities |
| Detected headphone connectivity |
| Detection on whether the device is plugged into an electric socket for charging |
| Historical latitude and longitude information |

Because device-side advertisement API 32 is able to access end user device properties 163, video advertising system 10 has additional criteria, beyond what is used by DSP 20, for selecting advertising campaigns most suitable for end user device 16. Because these selections are driven by actual, measured properties of end user device 16, they are less prone to error or fraud, and help ensure that advertiser 12 is receiving the type of advertising placement that advertiser 12 desires. The data collecting process 162 may include several different processes or worker threads operating in parallel. For example, the data collecting process 162 may include multiple data collections paths, which may have different levels of priority. For example, a fast data collection path may collect critical criteria and a slower data collection path may collect secondary criteria, and multiple different data collection paths may operate in parallel. Critical criteria may be defined by a user. For example, a user may only wish to display video advertisements on a large video player and may prefer high bandwidth, in which case, the user may make large video player a critical criteria, and make high bandwidth a secondary criteria.

Figure 7:
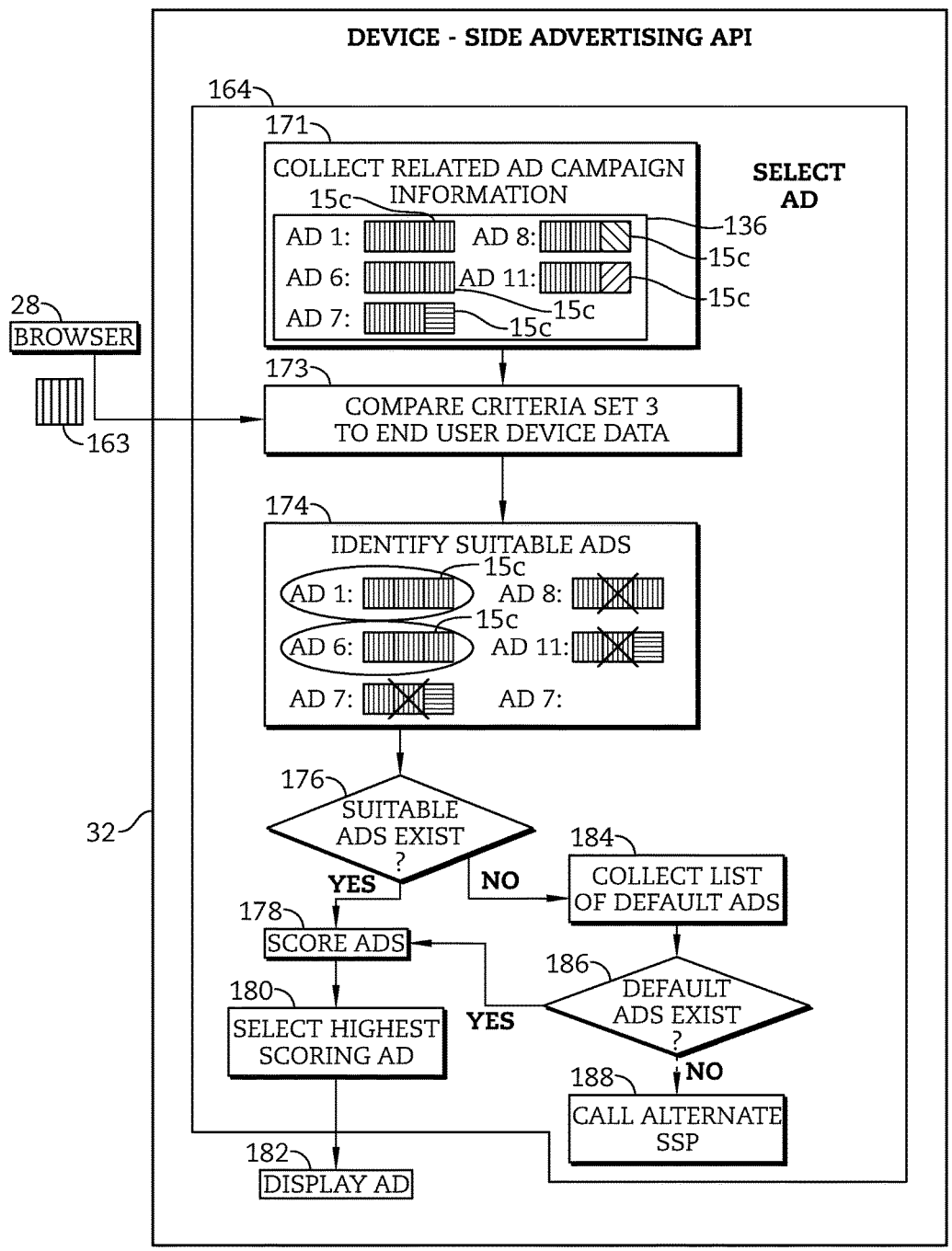
FIG. 7 is a diagrammatic view of an advertisement selecting process of FIG. 6 in accordance with the present disclosure, showing that the device-side advertisement API considers the advertising campaign that was selected by the publisher as the winning advertising campaign and also considers related advertising campaigns, and selects an advertising campaign for display based on a comparison of measured end user device properties with targeting criteria of the advertising campaigns.

As device-side advertisement API 32 collects end user device properties, it may also initiates advertisement selection process 164. FIG. 7 shows an advertisement selection process 164 in accordance with the present disclosure. Advertisement selection process 164 begins with collecting operation 171, in which device-side advertisement API 32 collects related advertising campaign information. As previously explained in connection with FIG. 5, related advertising campaign information may include a list of related advertising campaigns 136, which includes advertising campaigns that have attributes for Criteria Set One 15*a* and Criteria Set Two 15*b* that match those of winning advertising campaign 7. As also previously explained, related advertising campaign information may include targeting criteria 15 for each of the related advertising campaigns 136. The related advertising campaign information was transmitted to device-side advertisement API 32 in sending operation 150 of FIG. 5, and as such is available for use by device-side advertisement API 32 in collecting operation 171 of FIG. 7.

Advertisement selection process 164 may proceed to comparing operation 173, in which device-side advertisement API 32 compares attributes of Criteria Set Three 15c of related advertising campaigns 1, 6, 7, 8, 11 to measured end user device properties 163. As explained, end user device properties 163 may be retrieved from browser 28 as part of data collecting process 162, shown in FIG. 6.

In identifying operation 174, device-side advertisement API 32 identifies advertising campaigns that have attributes for Criteria Set Three 15c that align with end user device properties 163. For example, if advertising campaign 8 has an attribute for Criteria Set Three 15c specifying a high bandwidth connection, but end user device properties 163 indicate that end user device 16 does not have a high bandwidth connection, advertising campaign 8 may be ruled out. Likewise, if advertising campaign 11 has an attribute for Criteria Set Three 15c specifying a certain range for latitudinal and longitudinal location, but end user device properties 163 indicate that end user device 16 has a latitudinal and longitudinal location outside that range, advertising campaign 11 may be ruled out. In this illustrative example, advertising campaign 1 and advertising campaign 6 have attributes for Criteria Set Three 15c that align with end user device properties 163, as suggested by the use of boxes with similarly oriented vertical lines.

Thus, even though advertising campaign 7 was selected by DSP 20 as a winning advertising campaign, device-side advertisement API 32 can expand a search for an advertising campaign to other, related advertising campaigns. Device-side advertisement API 32 can improve on the selection of DSP 20 by comparing targeting criteria 15 of related advertising campaigns to end user device properties 163, and select an advertising campaign better suited for end user device 16.

Advertisement selection process 164 may proceed to operation 176, in which device-side advertisement API 32 determines whether suitable advertisements were identified by identifying operation 174. In this illustrative example, two advertising campaigns 1, 6 were identified. In such scenarios, advertisement selection process 164 proceeds to scoring operation 178, which scores each of the identified advertising campaigns 1, 6, and selecting operation 180, which selects the highest scoring advertising campaign. Scoring operation 178 and selecting operation 180 will be discussed in more detail in connection with FIG. 8.

In other scenarios, there may not be advertising campaigns that have attributes for Criteria Set Three 15c aligning with end user device properties 163. In such scenarios, advertisement selection process 164 may proceed to operation 184, which collects a list of default advertisements. As previously explained, a list of default advertisements 140 were collected by advertisement server 30, as shown in FIG. 5, and transmitted to device-side advertisement API 32.

If multiple default advertisements exist, advertisement selection process 164 may proceed to scoring operation 178 and selecting operation 180, which will be discussed in more detail in connection with FIG. 8. If no default advertisements exist, device-side advertisement API 32 may elect to sell the advertising opportunity to another buyer. To sell the advertising opportunity, advertisement selection process 164 may invoke operation 188, in which device-side advertisement API 32 calls alternate SSP 49 (shown in FIG. 1A) and communicates that the advertising opportunity is available. In another example embodiment, if no default advertisement exists, the device-side advertisement API 32 may elect to abort the advertising opportunity. For example, when no suitable advertisements were identified by identifying operation 174 due to some critical criteria not being fulfilled, the winning advertising campaign and all other advertising campaigns may be aborted or withdrawn. In an example embodiment, an advertising campaign is aborted because critical user device properties are not able to be confirmed within a predetermined period of time (e.g., 500 msec). For example, critical criteria (e.g., large video player) may be obtained using a fast data collection path, while other non-critical criteria (e.g., high bandwidth) may be obtained using a slower data collection path. If the device-side advertisement API 32, using a fast data collection path, cannot confirm that the user device has a large video player in 500 msec, then the advertisement campaign may be aborted or withdrawn. Thus, device-side advertisement API 32 may advantageously abort any advertising campaign based on erroneous or fraudulent declared data (e.g., large video player).

Figure 8:
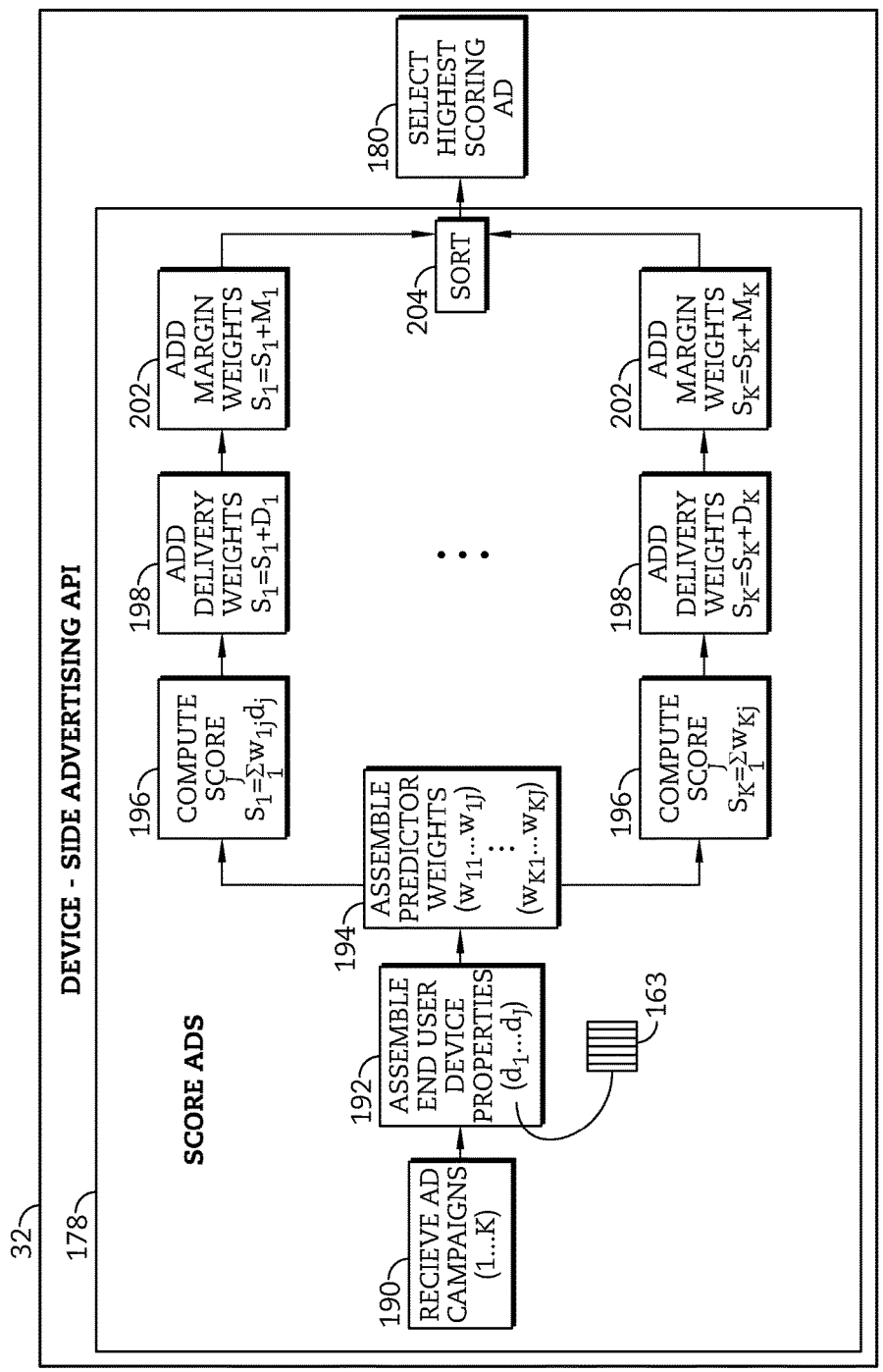
FIG. 8 is a diagrammatic view of a scoring operation and selecting operation shown in FIG. 7 in accordance with the present disclosure, showing how device-side advertisement API selects from among multiple advertising campaigns suitable for a particular end user device.

FIG. 8 shows a scoring operation 178 and selecting operation 180 in accordance with the present disclosure. Scoring operation 178 and selecting operation 180 use disambiguation criteria to determine which of multiple suitable advertising campaigns should be selected for display on end user device 16. As explained in connection with FIG. 4, in certain implementations, disambiguation criteria may be CMP or margin CPM. In such implementations (not shown in FIG. 8), scoring operation 178 may sort advertising campaigns according to CMP or margin CPM, as appropriate, and selecting operation 180 may select the advertising campaign with most favorable CPM or margin CPM metrics.

Alternatively, as was explained in connection with FIG. 4, disambiguation criteria may include predictor weights selected based on machine learning techniques. FIG. 8 shows scoring operation 178 when implemented with predictor weights. Scoring operation 178 begins with operation 190, in which advertising campaigns are received. In the illustrative example of FIG. 7, advertising campaign 1 and advertising campaign 6 are received for scoring. More generally, and as shown in FIG. 8, receiving operation 190 may receive K advertising campaigns.

In operation 192, device-side advertisement API 32 assembles end user device properties 163, denoted as $d_j$. In operation 194, device-side advertisement API 32 assembles predictor weights $w_{k,j}$ for each advertising campaign k. Predictor weights $w_{k,j}$ for a given advertising campaign k can be determined according to the predictor weight selection process 110, discussed in connection with FIG. 4.

In operation 196, device-side advertisement API 32 computes a score $S_k$ for each advertising campaign k. The score may be computed as the sum of the products of each predictor weight $w_{k,j}$ and a corresponding end user device property $d_j$. Scores $S_k$ may optionally be boosted for certain advertising campaigns k based on criteria of interest. For example, in operation 198, a delivery weight $D_k$ is added to the score $S_k$, and in operation 202, a margin weight $M_k$ is added to the score $S_k$. These weights may boost scores for advertising campaigns that have not been delivering according to expectations, or that generate higher margins. The resulting scores $S_k$ are sorted in operation 204, after which selecting operation 180 selects the highest scoring advertisement.

Returning to FIG. 6, in addition to advertisement selection process 164 and data collecting process 162 already described, device-side advertisement API 32 also generates viewability measuring process 166. Viewability measuring process 166 may measure the portion of a video advertisement that is viewable to a user. Typically, when an end user loads a content page containing a video, the user may scroll vertically or laterally to different locations on the content page. At times during this scrolling, portions of the video may fall outside the viewable area of the content page. Video advertising system 10 measures what portion of the video is viewable.

Viewability measurements may be advantageous for a number of reasons. For one, viewability measurements provide advertiser 12 with information on the effectiveness of a video advertisement. For another, viewability statistics collected over time can provide advertiser 12 with useful information on its advertising campaigns. For yet another, video advertising system 10 may take actions on end user device 16 based on viewability measurements. For example, as will be explained below, video advertising system 10 may pause a video advertisement when a pre-determined threshold of the video advertisement is not viewable due to user scrolling, and may resume the video advertisement when the user scrolls back as to reveal more of the video advertisement. This may promote user engagement with the video advertisement, and ensure that advertiser 12 does not expend resources on a video advertisement that a user does not see.

Figure 9:
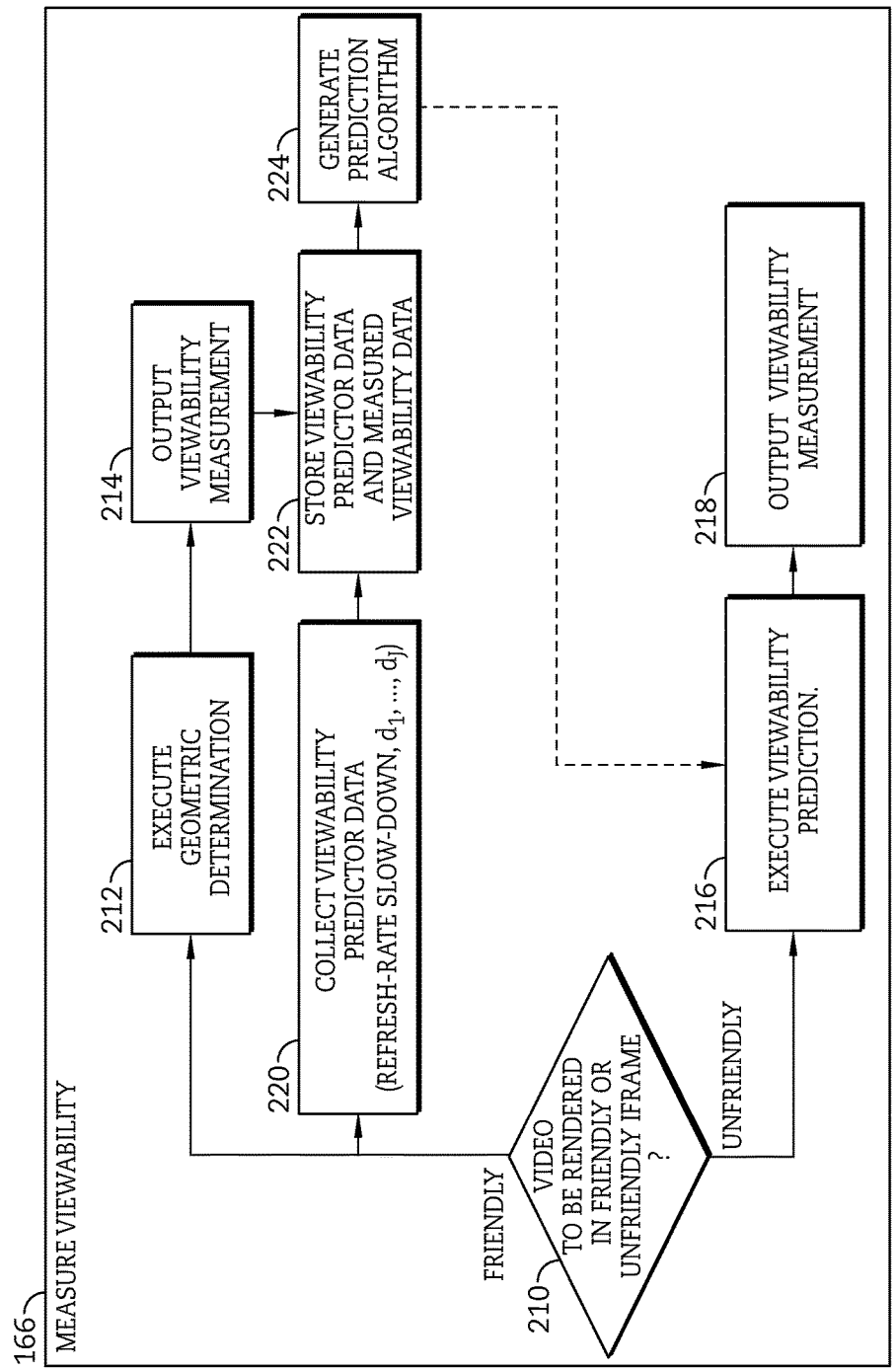
FIG. 9 is a diagrammatic view of a viewability measuring process shown in FIG. 6 in accordance with the present disclosure, showing that device-side advertisement API can generate viewability measurements both in situations where direct, geometric measurements are available and in situations where direct, geometric measurements are not available.

FIG. 9 illustrates a viewability measuring process 166 in accordance with the present disclosure. Generally, there are certain situations in which device-side advertisement API 32 can directly and deterministically measure how much of a video is viewable, and other situations in which direct and deterministic measurements are unavailable. For example, deterministic measurements are available when video is rendered in Friendly iFrames, but may be unavailable when video is rendered in unFriendly iFrames. An inline frame (e.g., iFrame) may refer to a programmatic element that sets off a portion of a content page for rendering certain content. Inline frames may be used, for example, by a web browser on a web page or web-based application. Also, inline frames may be used other user interfaces or in an application. A Friendly iFrame may refer to an iFrame having content that has access to or can manipulate content appearing elsewhere on the content page, outside the Friendly iFrame. An unFriendly iFrame, on the other hand, may refer to an iFrame having content that cannot access or manipulate content appearing elsewhere on the content page. For the case of unFriendly iFrames, browser 28 may block access to dimensional metrics required to directly measure which portions of a video are viewable.

Viewability measuring process 166 is able to provide viewability measurements in both situations. As shown in FIG. 9, viewability measuring process 166 begins with operation 210, which determines whether a video advertisement will be rendered in an environment where direct measurement is possible, such as in a Friendly iFrame, or in an environment where direct measurement is unavailable, such as an unFriendly iFrame. If the video advertisement will be rendered in a Friendly iFrame, viewability measuring process 166 proceeds to geometric determination process 212, in which device-side advertisement API 32 computes a direct, geometric determination for viewability. In operation 214, the viewability measurement may be output. Geometric determination process 212 is discussed in more detail in FIG. 10.

If instead the video advertisement will be rendered in an environment where direct measurement is unavailable, such as an unFriendly iFrame, viewability measuring process 166 proceeds to viewability prediction operation 216, which computes a viewability prediction based on statistical inferences. The statistical inferences are based on predictors that will be described in more detail below. In operation 218, the viewability measurement may be output. Viewability prediction operation 216 is discussed in more detail in FIG. 11.

The statistical inferences used in viewability prediction operation 216 are based on machine learning techniques driven by training data and test data. Training data and test data may be collected when the video is being rendered in environments where direct measurements are available, such as in Friendly iFrames. In such scenarios, video advertising system 10 has access to direct measurements of actual viewability, and can also collect direct measurements of other predictors, as will be explained below. Thus, where video is being rendered in Friendly iFrames, viewability measuring process 166 not only takes direct viewability measurements using geometric determination process 212, but performs operations 220, 222, 224 that implement machine learning techniques to generate a prediction algorithm. The generated prediction algorithm can be applied by viewability prediction operation 216 in situations where video advertising is being rendered in unFriendly iFrames.

Figure 10:
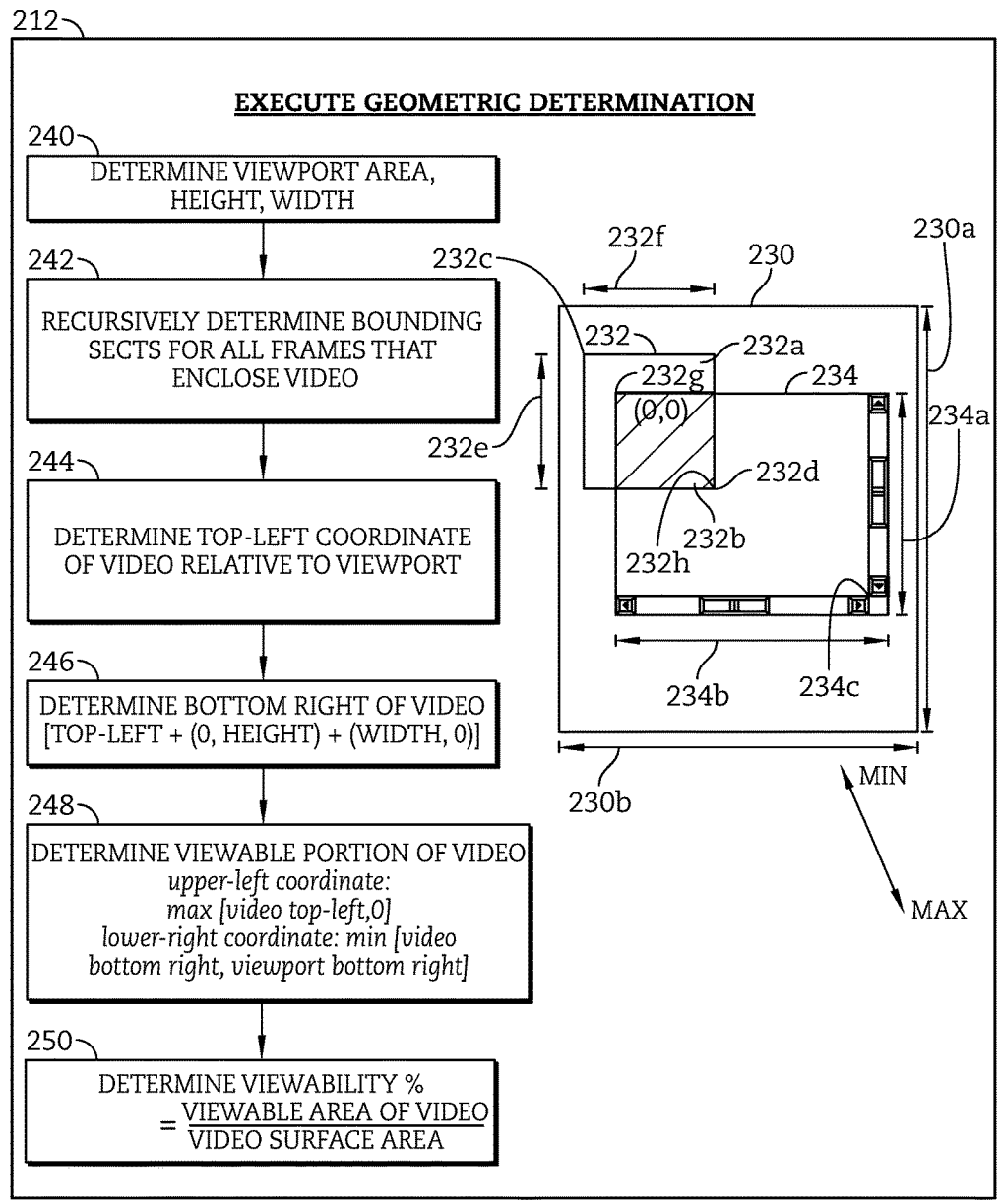
FIG. 10 is a diagrammatic view of a geometric determination process in accordance with the present disclosure, showing how the device-side advertisement API determines the viewability of videos rendered in Friendly iFrames.

FIG. 10 shows a geometric determination process 212 in accordance with the present disclosure, in which device-side advertisement API 32 determines the viewability of video rendered in Friendly iFrames. FIG. 10 shows a content page 230 containing a video 232 and a viewport 234. Viewport 234 represents the portion of content page 230 that a user can view, which may change based on the user's scrolling practices.

A portion 232a of video 232 is not viewable to the user, and a portion 232b is viewable to the user. Geometric determination process 212 may begin with operation 240, in which device-side advertisement API 32 determines a height 234a, width 234b, and area (height×width) of viewport 234.

In operation 242, device-side advertisement API 32 recursively determines bounding rectangles for all frames that enclose video 232. For example, JavaScript function getClientBoundingRect may be used. In operation 244, device-side advertisement API 32 determines a top-left coordinate 232c of video 232 relative to viewport 234, where the top-left coordinate of viewport 234 may be designated as an origin (0,0) point. In determining operation 246, device-side advertisement API 32 determines a bottom-right coordinate 232d of video 232 by adding video height 232e and video width 232f dimensions to top-left coordinate 232c. In operation 248, device-side advertisement API 32 determines a viewable portion 232b of video 232. To determine an upper-left coordinate 232g of viewable portion 232b, device-side advertisement API 32 determines the maximum of top-left coordinate 232c and the (0,0) origin point. To determine a lower-right coordinate 232h of viewable portion 232b, device-side advertisement API 32 determines the minimum of bottom-right coordinate 232d of video 232, and bottom right 234c of viewport 234. As shown in FIG. 10, the maximum operation seeks a point further towards the bottom-right, and the minimum operation seeks a point further towards the top-left.

Geometric determination process 212 may proceed to operation 250, which computes a viewability measurement by computing a viewable area of video 232 (product of height and width of viewable portion 232b), computing a video surface area (product of video height 232e and video width 232f), and taking a quotient.

As explained, where video advertising is being rendered in unFriendly iFrames, device-side advertisement API 32 may not have access to the coordinate-level information described above. Device-side advertisement API 32 may be restricted from determining any coordinates outside of the unFriendly iFrame. In such scenarios, device-side advertisement API 32 may perform viewability prediction operation 216.

Figure 11:
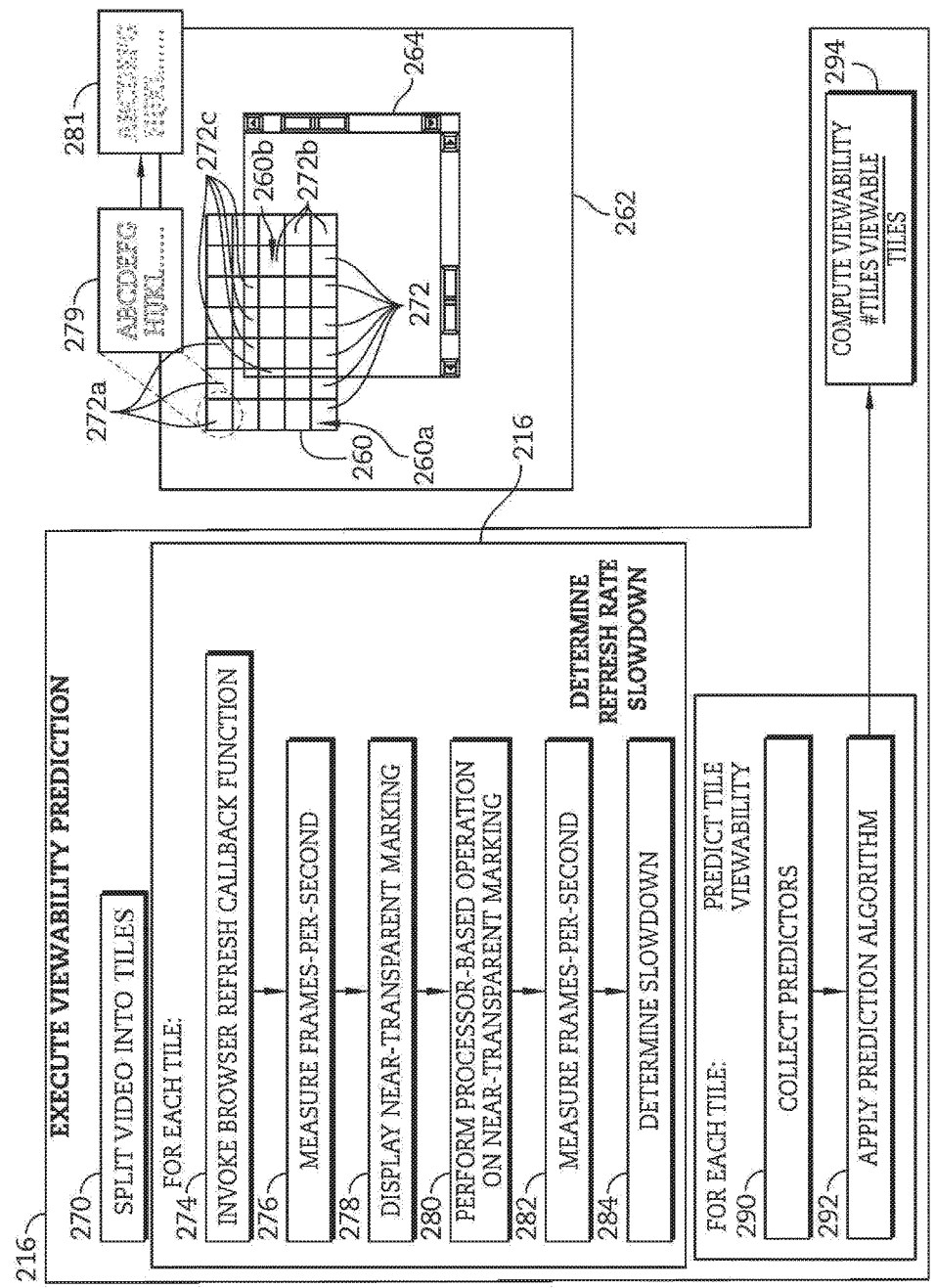
FIG. 11 is a diagrammatic view of a viewability prediction operation in accordance with the present disclosure, showing how the device-side advertisement API determines the viewability of videos rendered in unFriendly iFrames.

FIG. 11 illustrates a viewability prediction operation 216 in accordance with the present disclosure. FIG. 11 shows a video 260 that is part of a content page 262. Viewport 264 delineates a viewable portion of content page 262, and the portion of content page 262 visible within viewport 264 is adjustable by a user through scrolling. In the illustrated configuration, a portion 260a of video 260 lies outside viewport 264 and is therefore not viewable, and a portion 260b of video 260 is within viewport 264, and is therefore viewable.

Viewability prediction operation 216 predicts what portion of video 260 is viewable by splitting video 260 into tiles 272, performing a processor-based operation on video content in each of the tiles 272, measuring how the processor-based operation impacts the refresh rate of each of the tiles 272, and predicting whether each of the tiles 272 is viewable based on the extent to which the refresh rate of each of the tiles 272 changed. The processor-based operation on video content will typically slow down the refresh rate for viewable tiles 272b, because processor resources are diverted from refreshing operations by the processor-based operations. However, for non-viewable tiles 272a, the refresh rate may not slow down. The processor-based operation may not be carried out for non-viewable tiles 272a because they are not actually being rendered. As a result, the processor-based operation may not divert resources away from refreshing operations, yielding no change to the refresh rate.

Viewability prediction operation 216 begins with splitting operation 270, which splits video 260 into tiles 272. Device-side advertisement API 32 then performs a series of operations on each tile 272 to determine a refresh rate slowdown for each tile 272. In operation 274, device-side advertisement API 32 invokes a browser refresh callback function, which issues a callback from browser 28 to device-side advertisement API 32 each time browser 28 refreshes a tile 272. An example of such a callback function is requestAnimationFrame. In operation 276, device-side advertisement API 32 uses feedback from the callback function to measure a frames-per-second refresh rate for each tile 272, which is measured by tracking the frequency with which the callback function is invoked over time.

In operation 278, device-side advertisement API 32 displays near-transparent markings 279, such as the alphabet, on each tile 272. Near-transparent markings 279 may be selected to have a transparency level such that they are not viewable to an end user, and therefore do not distract from the video viewing experience. However, near-transparent markings 279 may be sufficiently opaque such that the processor of end user device 16 must perform processing to render near-transparent markings 279. In operation 280, device-side advertisement API 32 performs a processor-based operation on near-transparent markings 279. In this illustrative example, operation 280 blurs near-transparent text 279 to generate blurred text 281. Although this illustrative example uses blurring on near-transparent markings, any operation that makes use of computer processor resources of end user device 16 on a video, or portions of a video, may be suitable (e.g., dithering, undithering, blurring, unblurring). In an example embodiment, the markings may be iteratively blurred and unblurred on a periodic basis (e.g., 100 msec, 200 msec, 6 frames, 12 frames). For example, for a video played at 60 frames per second, a blurring operation may be applied to the markings for 6 frames, then the markings have no operation applied for 6 frames, then an unblurring operation may be applied to the markings for 6 frames, and then the markings have no operation applied for 6 frames, and the periodic blurring and unblurring may iteratively occur to determine refresh rates periodically.

In operation 282, device-side advertisement API 32 again measures a refresh rate for each tile. For non-viewable tiles 272a, there may be no appreciable change in the refresh rate. This is because browser 28 need not actually render tiles that are not viewable to the user. However, for viewable tiles 272b, there may be a slow-down in refresh rate. This is because processor-based operation 280 consumes CPU resources, diverting CPU resources away from the refreshing operations and invocation of the callback function. In operation 284, device-side advertisement API 32 determines the refresh rate slowdown for each tile. For example, a viewable tile that had previously been refreshing at a rate of 60 frames-per-second may now be refreshing at a rate of 55 frames-per-second.

After determining a refresh rate slowdown for each tile, device-side advertisement API 32 predicts whether each tile 272 is viewable. To do so, device-side advertisement API 32 performs operation 290, in which it collects predictors that can help generate statistical inferences on whether each tile 272 is viewable. Predictors may include the computed refresh rate slowdown, as well as end user device properties. End user device properties collected in operation 290 may include one or more of end user device properties 163 gathered in collecting operation shown in FIG. 6, and are denoted in FIG. 11 as $d_j$.

End user device properties 163 may be predictors of viewability because the amount of refresh rate slowdown that typically occurs when a tile 272 is viewable may be impacted based on properties of end user device 16. For example, if end user device 16 has a powerful, highly capable processor, the expected refresh rate slowdown for viewable tiles 272b may be lower in magnitude than where end user device 16 has a less powerful processor. As such, end user device properties 163 may be factored as predictors for viewability.

In operation 292, device-side advertisement API 32 may apply a prediction algorithm. The prediction algorithm used may be determined using machine learning techniques, as will be discussed in more detail in connection with FIG. 12. Generally, a prediction algorithm will input predictors, including the measured refresh rate slowdown for each tile and end user device properties $d_j$, and output an inference on whether that tile 272 is viewable.

In operation 294, device-side advertisement API 32 may compute a viewability measurement by adding the number of tiles 272 that were inferred to be viewable and dividing by the total number of tiles 272, yielding a prediction on the percentage of video 260 that is viewable. If the prediction algorithm has been suitably refined through machine learning techniques (as will be discussed in connection with FIG. 12), device-side advertisement API 32 will generate statistical inferences that non-viewable tiles 272a are not viewable to a user, and that viewable tiles 272b are viewable to a user. For partially viewable tiles 272c, a refined prediction algorithm may have difficulty inferring whether tiles 272c are viewable or not viewable, owing to the fact that they are only partially viewable. The prediction algorithm may infer that some of tiles 272c are viewable and others are not viewable, and any potential error in the computed viewability measurement due to partially viewable tiles 272c may be minimal.

In alternative implementations, viewability prediction operation 216 may do more than simply infer whether each of the tiles 272 is viewable or not viewable. Viewability prediction operation 216 may further assess what percentage of each of the tiles 272 is viewable or not viewable. Thus, for partially viewable tiles 272c, viewability prediction operation 216 may infer a percentage for each of tiles 272c that is viewable. The prediction algorithm may be configured to infer that a greater percentage of a partially viewable tile 272c is viewable where the refresh rate slowdown for tile 272c is larger in magnitude. Viewability prediction operation 216 may then compute an overall viewability measurement by averaging viewability percentage inferences for each of tiles 272.

In still other implementations, viewability prediction operation 216 may not split video 260 into tiles 272 at all. Instead, viewability prediction operation 216 may assess an overall refresh rate slowdown for video 260 in its entirety, and correlate the extent of refresh rate slowdown with a viewability percentage inference.

Figure 12:
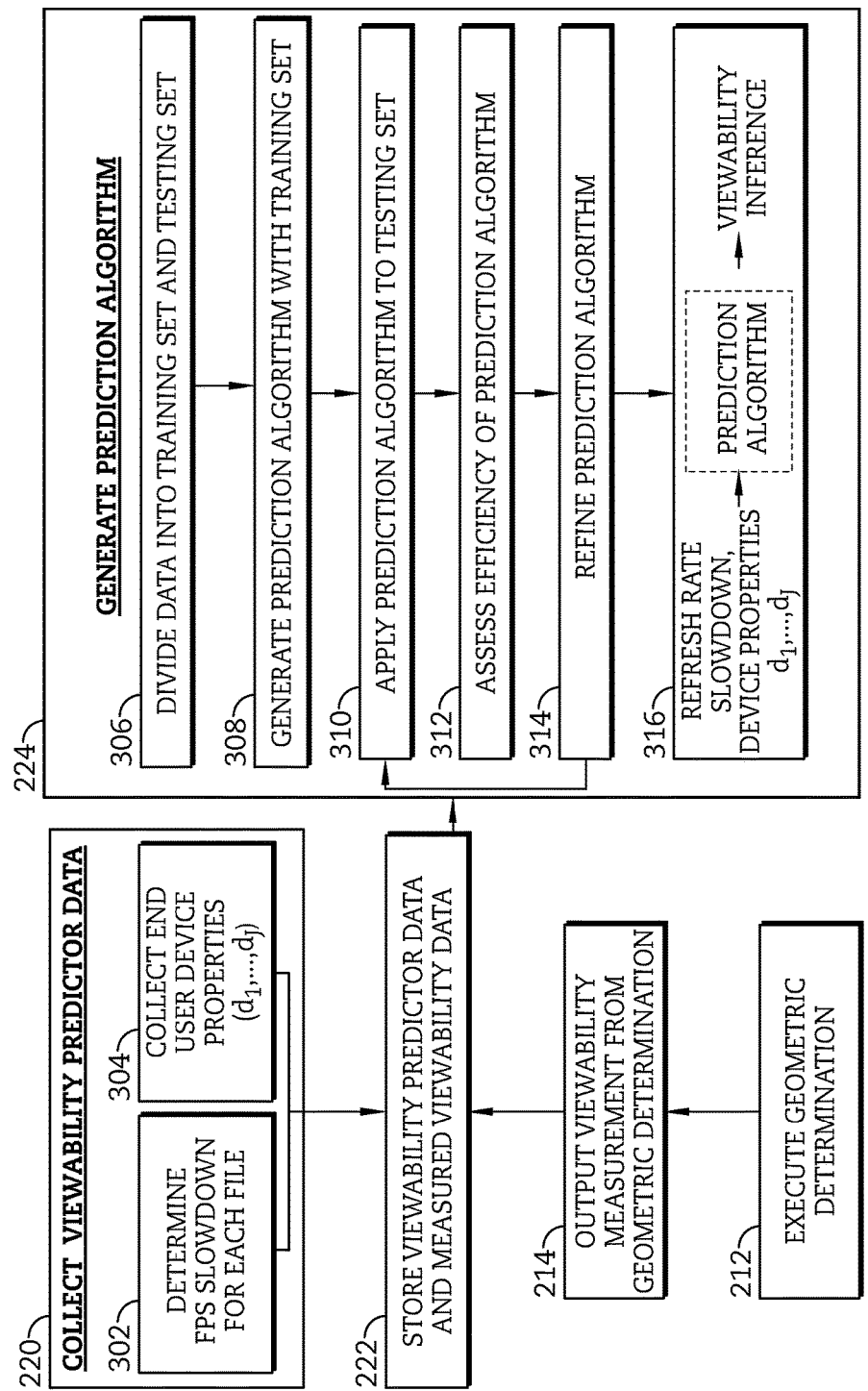
FIG. 12 is a diagrammatic view illustrating how the device-side advertisement API generates the prediction algorithm of FIG. 11 in accordance with the present disclosure.

FIG. 12 shows how device-side advertisement API 32 generates the prediction algorithm or prediction model of FIG. 11. FIG. 12 shows operations 220, 222, 214, and 224 of FIG. 9 in more detail. Device-side advertisement API 32 generates the prediction algorithm using machine learning techniques, including by collecting training data and testing data from scenarios where device-side advertisement API 32 directly measures viewability of videos.

In operation 220, device-side advertisement API 32 collects predictor data. As explained, predictors include measurements on refresh rate slowdown for each tile 272, and end user device properties $d_j$. Thus, in operation 302, device-side advertisement API 32 splits a video into tiles and determines a refresh rate slowdown rate for each tile, using similar methodology to what was described in connection with FIG. 11. In addition, in operation 304, device-side advertisement API 32 collects end user device properties $d_j$.

In operation 222, the collected predictors are stored. In addition, operation 222 collects and stores actual viewability measurements, which are generated by geometric determination process 212. The predictors and actual viewability measurements are transmitted to prediction algorithm generating process 224.

To generate a prediction algorithm or prediction model, prediction algorithm generating process 224 may perform operation 306, in which it divides the data it received into a training data set and a testing data set. In operation 308, prediction algorithm generating process 224 uses the training data to generate parameter values for a prediction algorithm that can map a given set of predictors into an inference on whether a video tile having those predictors is likely viewable or not viewable.

In operation 310, prediction algorithm generating process 224 applies the generated prediction algorithm to testing data, and in operation 312 assesses the effectiveness of the prediction algorithm. If the prediction algorithm is not sufficiently effective, prediction algorithm generating process 224 performs refining operation 314, which iterates prediction algorithm generating process 224 through operations 310 and 312 until the prediction algorithm is sufficiently effective.

After the prediction algorithm is sufficiently effective, prediction algorithm generating process 224 proceeds to operation 316, in which it selects the result as the prediction algorithm to be used by device-side advertisement API 32 in scenarios where videos are being rendered in unFriendly iFrames.

Returning to FIG. 6, after performing viewability measuring process 166, device-side advertisement API 32 may take action on end user device 16 based on the measured viewability. For example, FIG. 6 shows exemplary operation 167, in which device-side advertisement API 32 pauses or plays a video advertisement depending on how much of the video advertisement is viewable.

Figure 13A:
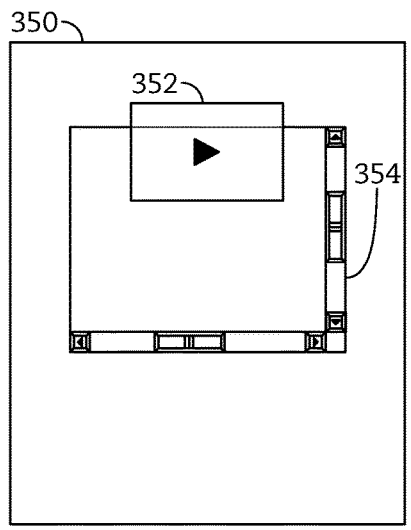
FIGS. 13A-C illustrate a process by which the device-side advertisement API pauses or plays a video advertisement based on viewability measurements in accordance with the present disclosure.
Figure 13B:
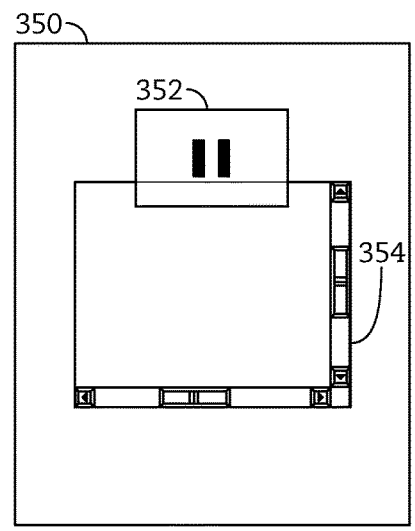
Figure 13C:
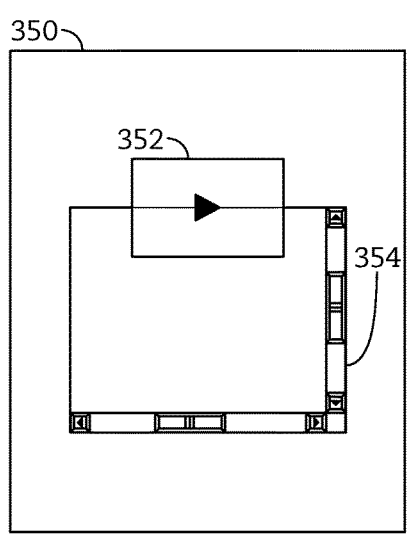

FIGS. 13A-C illustrate the process by which a device-side advertisement API 32 pauses or plays a video advertisement in accordance with the present disclosure. FIGS. 13A-C show a content page 350 having a video 352. Content page 350 is rendered on an end user device 16 having a browser viewport 354. In FIG. 13A, a majority of video 352 is viewable within viewport 354, and video 352 plays. In FIG. 13B, the end user has scrolled down on content page 350 such that a majority of video 352 is no longer viewable. In response, device-side advertisement API 32 pauses video 352. In FIG. 13C, the end user has scrolled back up on content page 350, such that a majority of video 352 is viewable again. In response, device-side advertisement API 32 resumes playback of video 352. Commands to play or pause video 352 may be sent to browser 28 through HTML5 and/or JavaScript comments.

Although the example above was with reference to pausing and resuming video playback, other actions are also within the scope of the present disclosure. For example, device-side advertisement API 32 may restart video 352 when the end user scrolls back up on content page 350, or select a different advertising campaign when the end user scrolls away from video 352.

As summarized above, and with reference to FIG. 6, device-side advertisement API 32 generates parallel processes in which it collects end user device properties 163, selects a video advertisement to display, and measures viewability of the video advertisement. Device-side advertisement API 32 may then proceed to displaying operation 182. In this illustration, advertising campaign 1 received a higher score than advertising campaign 7, and is therefore displayed on end user device 16.

In certain implementations, the media content file 4 for advertising campaign 1 (i.e., the video content file) is stored on a separate server, such as advertisement asset server 360. Device-side advertisement API 32 may query advertisement asset server 360 for the appropriate media content file 4, which is then displayed on end user device 16.

In certain implementations, browser 28 may have a native video player 29 capable of processing and rendering media content file 4. In instances where browser 28 may not have a suitable codec for media content file 4, device-side advertisement API 32 and/or browser 28 may invoke other software, such as a separate video player 35. In certain usage scenarios where browser 28 does not have a suitable codec for playing media content file 4 using HTML5/Javascript functionality, device-side advertisement API 32 may call a Flash-based API 36, which may in turn invoke another video player 35, which may be a Flash player.

Figure 14:
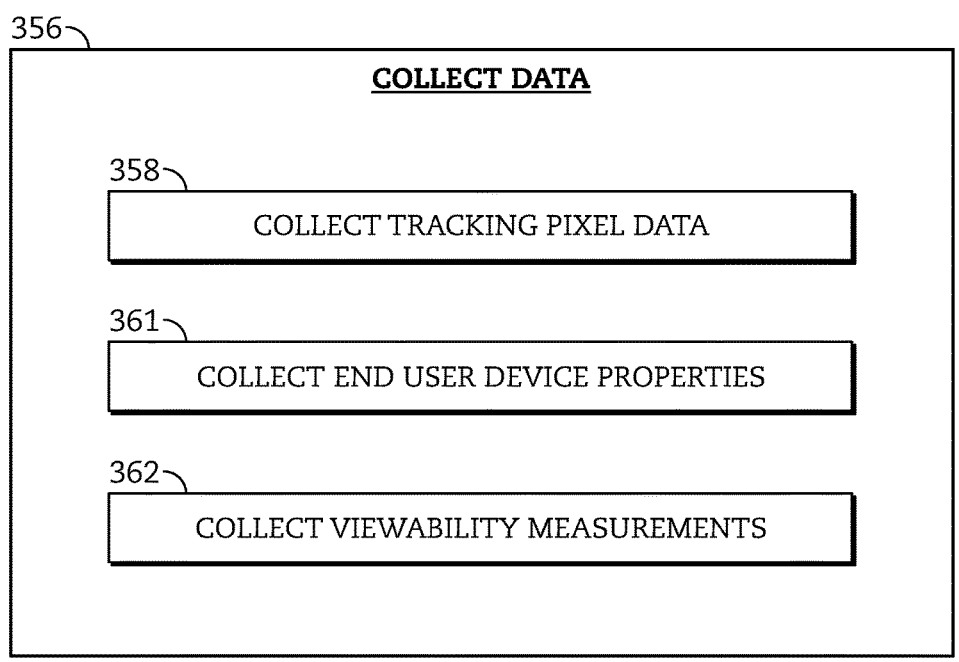
FIG. 14 is a diagrammatic view of a collecting operation performed by the device-side advertisement API, illustrating the types of data that the device-side advertisement API collects in accordance with the present disclosure.

In addition to displaying video advertisements, device-side advertisement API 32 also collects and sends data to a data warehouse 96. FIG. 14 shows a collecting operation 356 in accordance with the present disclosure. In operation 358, device-side advertisement API 32 may collect tracking pixel data. In operation 361, device-side advertisement API 32 may collect end user device properties 163. In operation 362, device-side advertisement API 32 may collect viewability measurements. In certain implementations, viewability measurements may be collected up to four times per second. Device-side advertisement API 32 may also collect pause and resume events that take place when device-side advertisement API 32 pauses or resumes playback of a video due to viewability.

Returning to FIG. 6, in operation 358, device-side advertisement API 32 sends the collected data to data warehouse 96. Once in data warehouse 96, the data may be used to provide reports to advertiser 12 via advertising console 18, to drive machine learning processes as discussed above, or otherwise be used for analytics.

End user device 16 may be a workstation, personal computer, laptop, tablet computer, mobile computing device, or smartphone. End user device 16 may include a processor and computer-readable memory on which is stored computer code that can be loaded into the processor for execution during runtime. The computer code stored on end user device 16 may include compiled binary files for browser 28, operating system 168, or other software applications 172.

Although aspects of the present disclosure were described with reference to video advertisements, it should be understood that the systems, components, and methodologies described above may be applied to video delivery in general, and are not limited to video advertisements. The systems, components, and methodologies in accordance with the present disclosure may provide benefits for video selection, targeting, delivery, display, data collection, and data analysis for any type of digital video.

Moreover, systems, components, and methodologies in accordance with the present disclosure may also be applied to other forms of media content, such as audio content, image content, or textual content. Providers of such content may benefit from content selection, targeting, delivery, display, data collection, and data analysis systems, components, and methodologies disclosed above.

End user device 16 may include hardware or software components pertaining to attributes for Criteria Set Three 15c, as disclosed above. For example, end user device 16 may include a GPS or other location-tracking module, video playback software supporting various sizes and resolutions, a WiFi chipset, a cellular connectivity chipset, a battery, a headphone jack for emitting audio signals, a power input for receiving external power, and other hardware or software components.

As explained, device-side advertisement API 32 may include HTML5 and/or JavaScript program code that is interpreted by browser 28, which may include an HTML5/JavaScript interpreter 28a. Executable code for running browser 28, including HTML5/JavaScript interpreter 28a, may be loaded into the processor of end user device 16 during runtime. End user device 16 may include a separate graphics processor to facilitate rendering of animated or graphical content. End user device 16 may include a display screen, such as a touch sensitive display screen.

Advertising console 18 may be provided as software implemented in source code that is compiled into executable code. Advertising console 18 may be provided on a computer having a processor and a memory, with the executable code for advertising console 18 loaded into the processor for execution at runtime. Advertising console 18 may also be provided on a server, such as a web server that permits advertiser 12 to access its functionality over the Internet.

Functionality of advertisement server 30 be provided as software implemented in source code that is compiled into executable code. Advertisement server 30 may include a processor and a memory, with executable code loaded into the processor for execution at runtime.

Analytics module 94 may be provided as software implemented in source code that is compiled into executable code. Analytics module 94 may be provided on a computer having a processor and a memory, with the executable code for analytics module 94 loaded into the processor for execution at runtime. Analytics module 94 may also be provided on a server, such as a web server that permits other components, such as advertisement server 30 and advertising console 18, to access its functionality over the Internet.

Data warehouse 96 and advertisement asset server 360 may each be implemented as a database stored on a database server having a processor and a memory. The databases may be implemented using any suitable database environment, such as Oracle, DB2, SQL Server, or MongoDB.

Content 24 may include Internet webpage content, Internet-enabled applications (e.g., from APPLE® App Store, GOOGLE® Play, WINDOWS® Phone Store, BLACKBERRY® App World), streaming videos provided by streaming video sources, or other types of network-sourced content.

Video advertising in accordance with the present disclosure may be rendered on a standalone basis within content, may be rendered pre-roll (i.e., prior to display of other video content), mid-roll (i.e., during display of other video content), or post-roll (i.e., after display of other video content).

Aspects of the subject matter described herein may be useful alone or in combination with one or more other aspects described herein. Without limiting the following description, in an exemplary aspect of the present disclosure, a method comprises: playing a video on a display; overlaying markings on the video while the video plays; at a first time while the video plays, measuring a first refresh rate of the video; at a second time while the video plays, performing a first operation on the markings; measuring a second refresh rate of the video at the second time; and determining an estimated area of the video displayed on the display based on the first refresh rate and the second refresh rate. In accordance with another exemplary aspect of the present disclosure, which may be used in combination with the preceding aspect, the method further comprises comparing the estimated area of the video displayed on the display to a threshold area. In accordance with another exemplary aspect of the present disclosure, which may be used in combination with any one or more of the preceding aspects, the method further comprises responsive to the estimated area of the video displayed on the display being less than the threshold area, pausing the video. In accordance with another exemplary aspect of the present disclosure, which may be used in combination with any one or more of the preceding aspects, the markings include text. In accordance with another exemplary aspect of the present disclosure, which may be used in combination with any one or more of the preceding aspects, the markings include at least one of alphanumeric characters and symbols. In accordance with another exemplary aspect of the present disclosure, which may be used in combination with any one or more of the preceding aspects, determining the estimated area of the video displayed on the display includes comparing the first refresh rate to the second refresh rate. In accordance with another exemplary aspect of the present disclosure, which may be used in combination with any one or more of the preceding aspects, the first operation includes blurring. In accordance with another exemplary aspect of the present disclosure, which may be used in combination with any one or more of the preceding aspects, the first operation includes dithering. In accordance with another exemplary aspect of the present disclosure, which may be used in combination with any one or more of the preceding aspects, the method further comprises: performing a second operation on the markings while the video plays; and measuring a third refresh rate of the video at the third time, wherein the estimated area of the video displayed on the display at the third time is determined based on the first refresh rate, the second refresh rate, and the third refresh rate. In accordance with another exemplary aspect of the present disclosure, which may be used in combination with any one or more of the preceding aspects, further comprises: comparing the estimated area of the video displayed on the display at the third time to the threshold area; and responsive to the estimated area of the video displayed on the display being greater than the threshold area, resume playing the video. In accordance with another exemplary aspect of the present disclosure, which may be used in combination with any one or more of the preceding aspects, the second operation includes at least one of unblurring and undithering. In accordance with another exemplary aspect of the present disclosure, which may be used in combination with any one or more of the preceding aspects, the markings are nearly transparent. In accordance with another exemplary aspect of the present disclosure, which may be used in combination with any one or more of the preceding aspects, the markings are substantially invisible to a user. In accordance with another exemplary aspect of the present disclosure, which may be used in combination with any one or more of the preceding aspects, determining the estimated area of the video displayed on the display is based on a refresh rate slowdown. In accordance with another exemplary aspect of the present disclosure, which may be used in combination with any one or more of the preceding aspects, the video includes a plurality of tiles, and the markings are overlaid on the video in a first tile of the plurality of tiles on the video. In accordance with another exemplary aspect of the present disclosure, which may be used in combination with any one or more of the preceding aspects, additional markings are overlaid on a second tile of the plurality of tiles on the video. In accordance with another exemplary aspect of the present disclosure, which may be used in combination with any one or more of the preceding aspects, determining the estimated area of the video displayed on the display is based on a plurality of refresh rates from a plurality of different tiles on the video. In accordance with another exemplary aspect of the present disclosure, which may be used in combination with any one or more of the preceding aspects, the first refresh rate is greater than the second refresh rate when at least a first area of the video is displayed on the display. In accordance with another exemplary aspect of the present disclosure, which may be used in combination with any one or more of the preceding aspects, the refresh rate is measured in frames per second. In accordance with another exemplary aspect of the present disclosure, which may be used in combination with any one or more of the preceding aspects, the second time is at least 100 milliseconds after the first time. In accordance with another exemplary aspect of the present disclosure, which may be used in combination with any one or more of the preceding aspects, the threshold area is 50%. In accordance with another exemplary aspect of the present disclosure, which may be used in combination with any one or more of the preceding aspects, the video is played in an inline frame. In accordance with another exemplary aspect of the present disclosure, which may be used in combination with any one or more of the preceding aspects, the inline frame is an unfriendly iFrame. In accordance with another exemplary aspect of the present disclosure, which may be used in combination with any one or more of the preceding aspects, the video is displayed in a Flash player. In accordance with another exemplary aspect of the present disclosure, which may be used in combination with any one or more of the preceding aspects, the video is displayed in native video player. In accordance with another exemplary aspect of the present disclosure, which may be used in combination with any one or more of the preceding aspects, the native video player uses at least one of HTML5 and JavaScript. In accordance with another exemplary aspect of the present disclosure, which may be used in combination with any one or more of the preceding aspects, the inline frame is a friendly iFrame. In accordance with another exemplary aspect of the present disclosure, which may be used in combination with any one or more of the preceding aspects, the method further comprises executing a geometric determination of the estimated area of the video displayed in the inline frame. In accordance with another exemplary aspect of the present disclosure, which may be used in combination with any one or more of the preceding aspects, the video is displayed in a viewport, which includes a viewable portion of content that is adjustable through scrolling. In accordance with another exemplary aspect of the present disclosure, which may be used in combination with any one or more of the preceding aspects, the estimated area of the video displayed on the display changes based on a user scrolling at least one of vertically and laterally within the viewport.

In accordance with another exemplary aspect of the present disclosure, which may be used in combination with any one or more of the preceding aspects, a client comprises: a display; and a processor configured to control the display to: play a video on the display; display markings overlaid on the video while the video plays; at a first time while the video plays, measure a first refresh rate of the video; at a second time while the video plays, perform a first operation on the markings; and measure a second refresh rate of the video at the second time. In accordance with another exemplary aspect of the present disclosure, which may be used in combination with any one or more of the preceding aspects, the processor sends the first refresh rate and the second refresh rate to a server. In accordance with another exemplary aspect of the present disclosure, which may be used in combination with any one or more of the preceding aspects, the server determines an estimated area of the video displayed on the display based on the first refresh rate and the second refresh rate. In accordance with another exemplary aspect of the present disclosure, which may be used in combination with any one or more of the preceding aspects, determining the estimated area of the video displayed on the display includes comparing the first refresh rate to the second refresh rate. In accordance with another exemplary aspect of the present disclosure, which may be used in combination with any one or more of the preceding aspects, the server sends the estimated area of the video displayed on the display to the client. In accordance with another exemplary aspect of the present disclosure, which may be used in combination with any one or more of the preceding aspects, determining the estimated area of the video displayed on the display is based on a refresh rate slowdown. In accordance with another exemplary aspect of the present disclosure, which may be used in combination with any one or more of the preceding aspects, the processor compares the estimated area of the video displayed on the display to a threshold area. In accordance with another exemplary aspect of the present disclosure, which may be used in combination with any one or more of the preceding aspects, responsive to the estimated area of the video displayed on the display being less than the threshold area, the processor pauses the video. In accordance with another exemplary aspect of the present disclosure, which may be used in combination with any one or more of the preceding aspects, the processor performs a second operation on the markings while the video plays and measures a third refresh rate of the video at the third time, wherein an estimated area of the video displayed on the display at the third time is determined based on the first refresh rate, the second refresh rate, and the third refresh rate. In accordance with another exemplary aspect of the present disclosure, which may be used in combination with any one or more of the preceding aspects, the processor compares the estimated area of the video displayed on the display at the third time to the threshold area, and responsive to the estimated area of the video displayed on the display being greater than the threshold area, resumes playing the video. In accordance with another exemplary aspect of the present disclosure, which may be used in combination with any one or more of the preceding aspects, the second operation includes at least one of unblurring and undithering. In accordance with another exemplary aspect of the present disclosure, which may be used in combination with any one or more of the preceding aspects, the markings include text. In accordance with another exemplary aspect of the present disclosure, which may be used in combination with any one or more of the preceding aspects, the markings include at least one of alphanumeric characters and symbols. In accordance with another exemplary aspect of the present disclosure, which may be used in combination with any one or more of the preceding aspects, the first operation includes blurring. In accordance with another exemplary aspect of the present disclosure, which may be used in combination with any one or more of the preceding aspects, the first operation includes dithering. In accordance with another exemplary aspect of the present disclosure, which may be used in combination with any one or more of the preceding aspects, the markings are nearly transparent. In accordance with another exemplary aspect of the present disclosure, which may be used in combination with any one or more of the preceding aspects, the markings are substantially invisible to a user. In accordance with another exemplary aspect of the present disclosure, which may be used in combination with any one or more of the preceding aspects, the video includes a plurality of tiles, and the markings are overlaid on the video in a first tile of the plurality of tiles on the video. In accordance with another exemplary aspect of the present disclosure, which may be used in combination with any one or more of the preceding aspects, additional markings are overlaid on a second tile of the plurality of tiles on the video. In accordance with another exemplary aspect of the present disclosure, which may be used in combination with any one or more of the preceding aspects, determining an estimated area of the video displayed on the display is based on a plurality of refresh rates from a plurality of different tiles on the video. In accordance with another exemplary aspect of the present disclosure, which may be used in combination with any one or more of the preceding aspects, the first refresh rate is greater than the second refresh rate when at least a first area of the video is displayed on the display. In accordance with another exemplary aspect of the present disclosure, which may be used in combination with any one or more of the preceding aspects, the refresh rate is measured in frames per second. In accordance with another exemplary aspect of the present disclosure, which may be used in combination with any one or more of the preceding aspects, the second time is at least 100 milliseconds after the first time. In accordance with another exemplary aspect of the present disclosure, which may be used in combination with any one or more of the preceding aspects, the threshold area is 50%. In accordance with another exemplary aspect of the present disclosure, which may be used in combination with any one or more of the preceding aspects, the video is played in an inline frame. In accordance with another exemplary aspect of the present disclosure, which may be used in combination with any one or more of the preceding aspects, wherein the inline frame is an unfriendly iFrame. In accordance with another exemplary aspect of the present disclosure, which may be used in combination with any one or more of the preceding aspects, the video is displayed in a Flash player. In accordance with another exemplary aspect of the present disclosure, which may be used in combination with any one or more of the preceding aspects, the video is displayed in native video player. In accordance with another exemplary aspect of the present disclosure, which may be used in combination with any one or more of the preceding aspects, the native video player uses at least one of HTML5 and JavaScript. In accordance with another exemplary aspect of the present disclosure, which may be used in combination with any one or more of the preceding aspects, the inline frame is a friendly iFrame. In accordance with another exemplary aspect of the present disclosure, which may be used in combination with any one or more of the preceding aspects, the processor executes a geometric determination of the estimated area of the video displayed in the inline frame. In accordance with another exemplary aspect of the present disclosure, which may be used in combination with any one or more of the preceding aspects, the video is displayed in a viewport, which includes a viewable portion of content that is adjustable through scrolling. In accordance with another exemplary aspect of the present disclosure, which may be used in combination with any one or more of the preceding aspects, an estimated area of the video displayed on the display changes based on a user scrolling at least one of vertically and laterally within the viewport.

In accordance with another exemplary aspect of the present disclosure, which may be used in combination with any one or more of the preceding aspects, an apparatus comprises: a processor configured to: receive a first refresh rate of a video, wherein the first refresh rate of the video is measured at a first time while the video plays; receive a second refresh rate of the video, wherein the second refresh rate of the video is measured at a second time while the video plays and a first operation is performed on markings overlaying the video; determine an estimated area of the video displayed based on the first refresh rate and the second refresh rate; compare the estimated area of the video displayed on the display to a threshold area; and responsive to the estimated area of the video displayed on the display being less than the threshold area, controlling playback of the video. In accordance with another exemplary aspect of the present disclosure, which may be used in combination with any one or more of the preceding aspects, controlling playback of the video includes pausing the video. In accordance with another exemplary aspect of the present disclosure, which may be used in combination with any one or more of the preceding aspects, the markings include text. In accordance with another exemplary aspect of the present disclosure, which may be used in combination with any one or more of the preceding aspects, the markings include at least one of alphanumeric characters and symbols. In accordance with another exemplary aspect of the present disclosure, which may be used in combination with any one or more of the preceding aspects, determining the estimated area of the video displayed on the display includes comparing the first refresh rate to the second refresh rate. In accordance with another exemplary aspect of the present disclosure, which may be used in combination with any one or more of the preceding aspects, the first operation includes blurring. In accordance with another exemplary aspect of the present disclosure, which may be used in combination with any one or more of the preceding aspects, the first operation includes dithering. In accordance with another exemplary aspect of the present disclosure, which may be used in combination with any one or more of the preceding aspects, the processor receives a third refresh rate of the video, wherein the third refresh rate of the video is measured at a third time while the video plays and a second operation is performed on the markings overlaying the video. In accordance with another exemplary aspect of the present disclosure, which may be used in combination with any one or more of the preceding aspects, the estimated area of the video displayed on the display at the third time is determined based on the first refresh rate, the second refresh rate, and the third refresh rate. In accordance with another exemplary aspect of the present disclosure, which may be used in combination with any one or more of the preceding aspects, the estimated area of the video displayed on the display at the third time is compared to the threshold area, and responsive to the estimated area of the video displayed on the display being greater than the threshold area, the video resumes playing. In accordance with another exemplary aspect of the present disclosure, which may be used in combination with any one or more of the preceding aspects, the second operation includes at least one of unblurring and undithering. In accordance with another exemplary aspect of the present disclosure, which may be used in combination with any one or more of the preceding aspects, the markings are nearly transparent. In accordance with another exemplary aspect of the present disclosure, which may be used in combination with any one or more of the preceding aspects, the markings are substantially invisible to a user. In accordance with another exemplary aspect of the present disclosure, which may be used in combination with any one or more of the preceding aspects, determining the estimated area of the video displayed on the display is based on a refresh rate slowdown. In accordance with another exemplary aspect of the present disclosure, which may be used in combination with any one or more of the preceding aspects, the video includes a plurality of tiles, and the markings are overlaid on the video in a first tile of the plurality of tiles on the video. In accordance with another exemplary aspect of the present disclosure, which may be used in combination with any one or more of the preceding aspects, additional markings are overlaid on a second tile of the plurality of tiles on the video. In accordance with another exemplary aspect of the present disclosure, which may be used in combination with any one or more of the preceding aspects, determining the estimated area of the video displayed on the display is based on a plurality of refresh rates from a plurality of different tiles on the video. In accordance with another exemplary aspect of the present disclosure, which may be used in combination with any one or more of the preceding aspects, the first refresh rate is greater than the second refresh rate when at least a first area of the video is displayed on the display. In accordance with another exemplary aspect of the present disclosure, which may be used in combination with any one or more of the preceding aspects, the refresh rate is measured in frames per second. In accordance with another exemplary aspect of the present disclosure, which may be used in combination with any one or more of the preceding aspects, the second time is at least 100 milliseconds after the first time. In accordance with another exemplary aspect of the present disclosure, which may be used in combination with any one or more of the preceding aspects, the threshold area is 50%. In accordance with another exemplary aspect of the present disclosure, which may be used in combination with any one or more of the preceding aspects, the video is played in an inline frame. In accordance with another exemplary aspect of the present disclosure, which may be used in combination with any one or more of the preceding aspects, the inline frame is an unfriendly iFrame. In accordance with another exemplary aspect of the present disclosure, which may be used in combination with any one or more of the preceding aspects, the video is displayed in a Flash player. In accordance with another exemplary aspect of the present disclosure, which may be used in combination with any one or more of the preceding aspects, the video is displayed in native video player. In accordance with another exemplary aspect of the present disclosure, which may be used in combination with any one or more of the preceding aspects, the native video player uses at least one of HTML5 and JavaScript. In accordance with another exemplary aspect of the present disclosure, which may be used in combination with any one or more of the preceding aspects, the inline frame is a friendly iFrame. In accordance with another exemplary aspect of the present disclosure, which may be used in combination with any one or more of the preceding aspects, the processor executes a geometric determination of the estimated area of the video displayed in the inline frame. In accordance with another exemplary aspect of the present disclosure, which may be used in combination with any one or more of the preceding aspects, the video is displayed in a viewport, which includes a viewable portion of content that is adjustable through scrolling. In accordance with another exemplary aspect of the present disclosure, which may be used in combination with any one or more of the preceding aspects, the estimated area of the video displayed on the display changes based on a user scrolling at least one of vertically and laterally within the viewport.

In accordance with another exemplary aspect of the present disclosure, which may be used in combination with any one or more of the preceding aspects, a computer readable medium stores instructions which, when executed by a processor, are configured to: play a video on a display; overlay markings on the video while the video plays; at a first time while the video plays, measure a first refresh rate of the video; at a second time while the video plays, perform a first operation on the markings; measure a second refresh rate of the video at the second time; and determine an estimated area of the video displayed on the display based on the first refresh rate and the second refresh rate. In accordance with another exemplary aspect of the present disclosure, which may be used in combination with any one or more of the preceding aspects, the processor is further configured to compare the estimated area of the video displayed on the display to a threshold area. In accordance with another exemplary aspect of the present disclosure, which may be used in combination with any one or more of the preceding aspects, the processor is further configured to, responsive to the estimated area of the video displayed on the display being less than the threshold area, pause the video. In accordance with another exemplary aspect of the present disclosure, which may be used in combination with any one or more of the preceding aspects, the markings include text. In accordance with another exemplary aspect of the present disclosure, which may be used in combination with any one or more of the preceding aspects, the markings include at least one of alphanumeric characters and symbols.

In accordance with another exemplary aspect of the present disclosure, which may be used in combination with any one or more of the preceding aspects, determining the estimated area of the video displayed on the display includes comparing the first refresh rate to the second refresh rate. In accordance with another exemplary aspect of the present disclosure, which may be used in combination with any one or more of the preceding aspects, the first operation includes blurring. In accordance with another exemplary aspect of the present disclosure, which may be used in combination with any one or more of the preceding aspects, the first operation includes dithering. In accordance with another exemplary aspect of the present disclosure, which may be used in combination with any one or more of the preceding aspects, the processor is further configured to: perform a second operation on the markings while the video plays; and measure a third refresh rate of the video at the third time, wherein the estimated area of the video displayed on the display at the third time is determined based on the first refresh rate, the second refresh rate, and the third refresh rate. In accordance with another exemplary aspect of the present disclosure, which may be used in combination with any one or more of the preceding aspects, the processor is further configured to: compare the estimated area of the video displayed on the display at the third time to the threshold area; and responsive to the estimated area of the video displayed on the display being greater than the threshold area, resume playing the video. In accordance with another exemplary aspect of the present disclosure, which may be used in combination with any one or more of the preceding aspects, the second operation includes at least one of unblurring and undithering. In accordance with another exemplary aspect of the present disclosure, which may be used in combination with any one or more of the preceding aspects, the markings are nearly transparent. In accordance with another exemplary aspect of the present disclosure, which may be used in combination with any one or more of the preceding aspects, the markings are substantially invisible to a user. In accordance with another exemplary aspect of the present disclosure, which may be used in combination with any one or more of the preceding aspects, determining the estimated area of the video displayed on the display is based on a refresh rate slowdown. In accordance with another exemplary aspect of the present disclosure, which may be used in combination with any one or more of the preceding aspects, the video includes a plurality of tiles, and the markings are overlaid on the video in a first tile of the plurality of tiles on the video. In accordance with another exemplary aspect of the present disclosure, which may be used in combination with any one or more of the preceding aspects, additional markings are overlaid on a second tile of the plurality of tiles on the video. In accordance with another exemplary aspect of the present disclosure, which may be used in combination with any one or more of the preceding aspects, determining the estimated area of the video displayed on the display is based on a plurality of refresh rates from a plurality of different tiles on the video. In accordance with another exemplary aspect of the present disclosure, which may be used in combination with any one or more of the preceding aspects, the first refresh rate is greater than the second refresh rate when at least a first area of the video is displayed on the display. In accordance with another exemplary aspect of the present disclosure, which may be used in combination with any one or more of the preceding aspects, the refresh rate is measured in frames per second. In accordance with another exemplary aspect of the present disclosure, which may be used in combination with any one or more of the preceding aspects, the second time is at least 100 milliseconds after the first time. In accordance with another exemplary aspect of the present disclosure, which may be used in combination with any one or more of the preceding aspects, the threshold area is 50%. In accordance with another exemplary aspect of the present disclosure, which may be used in combination with any one or more of the preceding aspects, the video is played in an inline frame. In accordance with another exemplary aspect of the present disclosure, which may be used in combination with any one or more of the preceding aspects, the inline frame is an unfriendly iFrame. In accordance with another exemplary aspect of the present disclosure, which may be used in combination with any one or more of the preceding aspects, the video is displayed in a Flash player. In accordance with another exemplary aspect of the present disclosure, which may be used in combination with any one or more of the preceding aspects, the video is displayed in native video player. In accordance with another exemplary aspect of the present disclosure, which may be used in combination with any one or more of the preceding aspects, the native video player uses at least one of HTML5 and JavaScript. In accordance with another exemplary aspect of the present disclosure, which may be used in combination with any one or more of the preceding aspects, the inline frame is a friendly iFrame. In accordance with another exemplary aspect of the present disclosure, which may be used in combination with any one or more of the preceding aspects, the processor is further configured to: execute a geometric determination of the estimated area of the video displayed in the inline frame. In accordance with another exemplary aspect of the present disclosure, which may be used in combination with any one or more of the preceding aspects, the video is displayed in a viewport, which includes a viewable portion of content that is adjustable through scrolling. In accordance with another exemplary aspect of the present disclosure, which may be used in combination with any one or more of the preceding aspects, the estimated area of the video displayed on the display changes based on a user scrolling at least one of vertically and laterally within the viewport.

In accordance with another exemplary aspect of the present disclosure, which may be used in combination with any one or more of the preceding aspects, an apparatus comprises: means for playing a video; means for overlaying markings on the video while the video plays; means for measuring, at a first time while the video plays, a first refresh rate of the video; means for performing, at a second time while the video plays, a first operation on the markings; means for measuring a second refresh rate of the video at the second time; and means for determining an estimated area of the video displayed on the means for playing the video based on the first refresh rate and the second refresh rate.

In accordance with another exemplary aspect of the present disclosure, which may be used in combination with any one or more of the preceding aspects, a method comprises: receiving, from an advertiser, a plurality of attribute selections of a plurality of targeting criteria that are required to be fulfilled by a user device to serve a video advertisement to the user device, the plurality of attribute selections including at least a first attribute selection and a second attribute selection, wherein the second attribute selection relates to a measured first user device property; creating an advertising campaign including the plurality of targeting criteria based on the plurality of attribute selections, the plurality of targeting criteria including at least a first targeting criteria corresponding to the first attribute selection and a second targeting criteria corresponding to the second attribute selection; transmitting the first targeting criteria to a demand side platform, which provides a response based on the first targeting criteria to a publisher server, which manages content to be displayed to the user device, wherein the user device is notified by the publisher server of a winning first advertising campaign that fulfils the first targeting criteria; reserving the second targeting criteria until after the user device is notified of the winning first advertising campaign that fulfils the first targeting criteria; determining a plurality of related advertising campaigns including the first targeting criteria and the second targeting criteria, wherein each of the plurality of related advertising campaigns are related to the winning first advertising campaign; and transmitting, to the user device, the plurality of related advertising campaigns, wherein the user device measures the first user device property, compares the measured user device property to the second targeting criteria, and determines that the measured user device property fulfils the second targeting criteria of a second advertising campaign from the plurality of related advertising campaigns. In accordance with another exemplary aspect of the present disclosure, which may be used in combination with any one or more of the preceding aspects, the method further comprises receiving, from the user device, a request to serve the second advertising campaign. In accordance with another exemplary aspect of the present disclosure, which may be used in combination with any one or more of the preceding aspects, the method further comprises transmitting, to the user device, the video advertisement, which corresponds to the second advertising campaign. In accordance with another exemplary aspect of the present disclosure, which may be used in combination with any one or more of the preceding aspects, the method further comprises transmitting a device-side advertisement API to the user device. In accordance with another exemplary aspect of the present disclosure, which may be used in combination with any one or more of the preceding aspects, the device-side advertisement API measures the first user device property, compares the measured user device property to the second targeting criteria, and determines that the measured user device property fulfils the second targeting criteria of a second advertising campaign from the plurality of related advertising campaigns. In accordance with another exemplary aspect of the present disclosure, which may be used in combination with any one or more of the preceding aspects, the plurality of attribute selections includes a third attribute selection and the plurality of targeting criteria includes a third targeting criteria corresponding to the third attribute selection. In accordance with another exemplary aspect of the present disclosure, which may be used in combination with any one or more of the preceding aspects, the method further comprises transmitting the third targeting criteria with the first targeting criteria to the demand side platform, which provides the response based on the first targeting criteria and the third targeting criteria to the publisher server, wherein the winning first advertising campaign fulfils the third targeting criteria. In accordance with another exemplary aspect of the present disclosure, which may be used in combination with any one or more of the preceding aspects, the measured user device property fulfils the second targeting criteria when the measured user device property matches the second targeting criteria. In accordance with another exemplary aspect of the present disclosure, which may be used in combination with any one or more of the preceding aspects, the method further comprises setting a pointer to a default video advertisement, which is configured to be served responsive to the measured user device property not fulfilling the second targeting criteria of the winning advertising campaign and each respective advertising campaign from the plurality of related advertising campaigns. In accordance with another exemplary aspect of the present disclosure, which may be used in combination with any one or more of the preceding aspects, the method further comprises setting a URL to an alternate publisher server, which is configured to be accessed responsive to the measured user device property not fulfilling the second targeting criteria of the winning advertising campaign and each respective advertising campaign from the plurality of related advertising campaigns. In accordance with another exemplary aspect of the present disclosure, which may be used in combination with any one or more of the preceding aspects, the method further comprises setting quantitative goals relating to the advertising campaign. In accordance with another exemplary aspect of the present disclosure, which may be used in combination with any one or more of the preceding aspects, the method further comprises setting disambiguation criteria that are used to score advertising campaigns. In accordance with another exemplary aspect of the present disclosure, which may be used in combination with any one or more of the preceding aspects, the method further comprises setting playback criteria. In accordance with another exemplary aspect of the present disclosure, which may be used in combination with any one or more of the preceding aspects, the playback criteria requires the video advertisement to be paused when the video advertisement is outside of a viewable portion of a content page. In accordance with another exemplary aspect of the present disclosure, which may be used in combination with any one or more of the preceding aspects, the plurality of related advertising campaigns are assembled before the first targeting criteria are transmitted to the demand side platform. In accordance with another exemplary aspect of the present disclosure, which may be used in combination with any one or more of the preceding aspects, the plurality of related advertising campaigns are stored in a cache. In accordance with another exemplary aspect of the present disclosure, which may be used in combination with any one or more of the preceding aspects, the demand side platform identifies the winning advertising campaign. In accordance with another exemplary aspect of the present disclosure, which may be used in combination with any one or more of the preceding aspects, the method further comprises receiving a request for a video advertisement corresponding to the winning advertising campaign. In accordance with another exemplary aspect of the present disclosure, which may be used in combination with any one or more of the preceding aspects, the method further comprises: retrieving related advertising campaign information; and packaging the related advertising campaign information in a Video Ad Serving Template (VAST)/Video Player-Ad Interface Definition (VPAID) response. In accordance with another exemplary aspect of the present disclosure, which may be used in combination with any one or more of the preceding aspects, a VAST/VPAID compliant response includes a reference to a device-side advertisement API. In accordance with another exemplary aspect of the present disclosure, which may be used in combination with any one or more of the preceding aspects, the first targeting criteria includes a declared player size. In accordance with another exemplary aspect of the present disclosure, which may be used in combination with any one or more of the preceding aspects, the first targeting criteria includes an specific operating system. In accordance with another exemplary aspect of the present disclosure, which may be used in combination with any one or more of the preceding aspects, the first targeting criteria includes a specific device type. In accordance with another exemplary aspect of the present disclosure, which may be used in combination with any one or more of the preceding aspects, the second targeting criteria includes a measured latitude and longitude. In accordance with another exemplary aspect of the present disclosure, which may be used in combination with any one or more of the preceding aspects, the second targeting criteria includes a measured video player size. In accordance with another exemplary aspect of the present disclosure, which may be used in combination with any one or more of the preceding aspects, the second targeting criteria includes a measured video player resolution. In accordance with another exemplary aspect of the present disclosure, which may be used in combination with any one or more of the preceding aspects, the second targeting criteria includes a measured bandwidth. In accordance with another exemplary aspect of the present disclosure, which may be used in combination with any one or more of the preceding aspects, the second targeting criteria includes a measured battery level. In accordance with another exemplary aspect of the present disclosure, which may be used in combination with any one or more of the preceding aspects, the third targeting criteria includes a list of URLs.

In accordance with another exemplary aspect of the present disclosure, which may be used in combination with any one or more of the preceding aspects, a system comprises: at least one processor configured to: receive, from an advertiser, a plurality of attribute selections of a plurality of targeting criteria that are required to be fulfilled by a user device to serve a video advertisement to the user device, the plurality of attribute selections including at least a first attribute selection and a second attribute selection, wherein the second attribute selection relates to a measured first user device property; create an advertising campaign including the plurality of targeting criteria based on the plurality of attribute selections, the plurality of targeting criteria including at least a first targeting criteria corresponding to the first attribute selection and a second targeting criteria corresponding to the second attribute selection; transmit the first targeting criteria to a demand side platform, which provides a response based on the first targeting criteria to a publisher server, which manages content to be displayed to the user device, wherein the user device is notified by the publisher server of a winning first advertising campaign that fulfils the first targeting criteria; reserve the second targeting criteria until after the user device is notified of the winning first advertising campaign that fulfils the first targeting criteria; determine a plurality of related advertising campaigns including the first targeting criteria and the second targeting criteria, wherein each of the plurality of related advertising campaigns are related to the winning first advertising campaign; and transmit, to the user device, the plurality of related advertising campaigns, wherein the user device measures the first user device property, compares the measured user device property to the second targeting criteria, and determines that the measured user device property fulfils the second targeting criteria of a second advertising campaign from the plurality of related advertising campaigns. In accordance with another exemplary aspect of the present disclosure, which may be used in combination with any one or more of the preceding aspects, the system is an advertising service provider. In accordance with another exemplary aspect of the present disclosure, which may be used in combination with any one or more of the preceding aspects, the system includes an advertising server, an advertising console, an analytics module, and an advertising data warehouse. In accordance with another exemplary aspect of the present disclosure, which may be used in combination with any one or more of the preceding aspects, the system receives, from the user device, a request to serve the second advertising campaign. In accordance with another exemplary aspect of the present disclosure, which may be used in combination with any one or more of the preceding aspects, the system transmits, to the user device, the video advertisement, which corresponds to the second advertising campaign. In accordance with another exemplary aspect of the present disclosure, which may be used in combination with any one or more of the preceding aspects, the system transmits a device-side advertisement API to the user device. In accordance with another exemplary aspect of the present disclosure, which may be used in combination with any one or more of the preceding aspects, the device-side advertisement API measures the first user device property, compares the measured user device property to the second targeting criteria, and determines that the measured user device property fulfils the second targeting criteria of a second advertising campaign from the plurality of related advertising campaigns. In accordance with another exemplary aspect of the present disclosure, which may be used in combination with any one or more of the preceding aspects, the plurality of attribute selections includes a third attribute selection and the plurality of targeting criteria includes a third targeting criteria corresponding to the third attribute selection. In accordance with another exemplary aspect of the present disclosure, which may be used in combination with any one or more of the preceding aspects, the system transmits the third targeting criteria with the first targeting criteria to the demand side platform, which provides the response based on the first targeting criteria and the third targeting criteria to the publisher server, wherein the winning first advertising campaign fulfils the third targeting criteria. In accordance with another exemplary aspect of the present disclosure, which may be used in combination with any one or more of the preceding aspects, the measured user device property fulfils the second targeting criteria when the measured user device property matches the second targeting criteria. In accordance with another exemplary aspect of the present disclosure, which may be used in combination with any one or more of the preceding aspects, the system sets a pointer to a default video advertisement, which is configured to be served responsive to the measured user device property not fulfilling the second targeting criteria of the winning advertising campaign and each respective advertising campaign from the plurality of related advertising campaigns. In accordance with another exemplary aspect of the present disclosure, which may be used in combination with any one or more of the preceding aspects, the system sets a URL to an alternate publisher server, which is configured to be accessed responsive to the measured user device property not fulfilling the second targeting criteria of the winning advertising campaign and each respective advertising campaign from the plurality of related advertising campaigns. In accordance with another exemplary aspect of the present disclosure, which may be used in combination with any one or more of the preceding aspects, the system sets quantitative goals relating to the advertising campaign. In accordance with another exemplary aspect of the present disclosure, which may be used in combination with any one or more of the preceding aspects, the system sets disambiguation criteria that are used to score advertising campaigns. In accordance with another exemplary aspect of the present disclosure, which may be used in combination with any one or more of the preceding aspects, the system sets playback criteria. In accordance with another exemplary aspect of the present disclosure, which may be used in combination with any one or more of the preceding aspects, the playback criteria requires the video advertisement to be paused when the video advertisement is outside of a viewable portion of a content page. In accordance with another exemplary aspect of the present disclosure, which may be used in combination with any one or more of the preceding aspects, the plurality of related advertising campaigns are assembled before the first targeting criteria are transmitted to the demand side platform. In accordance with another exemplary aspect of the present disclosure, which may be used in combination with any one or more of the preceding aspects, the plurality of related advertising campaigns are stored in a cache. In accordance with another exemplary aspect of the present disclosure, which may be used in combination with any one or more of the preceding aspects, the demand side platform identifies the winning advertising campaign. In accordance with another exemplary aspect of the present disclosure, which may be used in combination with any one or more of the preceding aspects, the system receives a request for a video advertisement corresponding to the winning advertising campaign. In accordance with another exemplary aspect of the present disclosure, which may be used in combination with any one or more of the preceding aspects, the system retrieves related advertising campaign information and packages the related advertising campaign information in a Video Ad Serving Template (VAST)/Video Player-Ad Interface Definition (VPAID) response. In accordance with another exemplary aspect of the present disclosure, which may be used in combination with any one or more of the preceding aspects, a VAST/VPAID compliant response includes a reference to a device-side advertisement API. In accordance with another exemplary aspect of the present disclosure, which may be used in combination with any one or more of the preceding aspects, the first targeting criteria includes a declared player size. In accordance with another exemplary aspect of the present disclosure, which may be used in combination with any one or more of the preceding aspects, the first targeting criteria includes an specific operating system. In accordance with another exemplary aspect of the present disclosure, which may be used in combination with any one or more of the preceding aspects, the first targeting criteria includes a specific device type. In accordance with another exemplary aspect of the present disclosure, which may be used in combination with any one or more of the preceding aspects, the second targeting criteria includes a measured latitude and longitude. In accordance with another exemplary aspect of the present disclosure, which may be used in combination with any one or more of the preceding aspects, the second targeting criteria includes a measured video player size. In accordance with another exemplary aspect of the present disclosure, which may be used in combination with any one or more of the preceding aspects, the second targeting criteria includes a measured video player resolution. In accordance with another exemplary aspect of the present disclosure, which may be used in combination with any one or more of the preceding aspects, the second targeting criteria includes a measured bandwidth. In accordance with another exemplary aspect of the present disclosure, which may be used in combination with any one or more of the preceding aspects, the second targeting criteria includes a measured battery level. In accordance with another exemplary aspect of the present disclosure, which may be used in combination with any one or more of the preceding aspects, the third targeting criteria includes a list of URLs.

In accordance with another exemplary aspect of the present disclosure, which may be used in combination with any one or more of the preceding aspects, a system comprises: means for receiving, from an advertiser, a plurality of attribute selections of a plurality of targeting criteria that are required to be fulfilled by a user device to serve a video advertisement to the user device, the plurality of attribute selections including at least a first attribute selection and a second attribute selection, wherein the second attribute selection relates to a measured first user device property; means for creating an advertising campaign including the plurality of targeting criteria based on the plurality of attribute selections, the plurality of targeting criteria including at least a first targeting criteria corresponding to the first attribute selection and a second targeting criteria corresponding to the second attribute selection; means for transmitting the first targeting criteria to a demand side platform, which provides a response based on the first targeting criteria to a publisher server, which manages content to be displayed to the user device, wherein the user device is notified by the publisher server of a winning first advertising campaign that fulfils the first targeting criteria; means for reserving the second targeting criteria until after the user device is notified of the winning first advertising campaign that fulfils the first targeting criteria; means for determining a plurality of related advertising campaigns including the first targeting criteria and the second targeting criteria, wherein each of the plurality of related advertising campaigns are related to the winning first advertising campaign; and means for transmitting, to the user device, the plurality of related advertising campaigns, wherein the user device measures the first user device property, compares the measured user device property to the second targeting criteria, and determines that the measured user device property fulfils the second targeting criteria of a second advertising campaign from the plurality of related advertising campaigns.

In accordance with another exemplary aspect of the present disclosure, which may be used in combination with any one or more of the preceding aspects, a method comprises: receiving, at a user device, a notification of a winning first advertising campaign that fulfils first targeting criteria; sending, to an advertising server, a request for a first video advertisement corresponding to the winning advertising campaign; receiving, from the advertising server, a plurality of related advertising campaigns each including the first targeting criteria and second targeting criteria, respectively, wherein each of the plurality of related advertising campaigns are related to the winning first advertising campaign; collecting user device properties of the user device including a first user device property required by the second targeting criteria; comparing the collected first user device property to the second targeting criteria; and determining that a second advertising campaign from the plurality of related advertising campaigns fulfils the second targeting criteria of the second advertising campaign. In accordance with another exemplary aspect of the present disclosure, which may be used in combination with any one or more of the preceding aspects, the method further comprises selecting the second advertising campaign to display on the user device. In accordance with another exemplary aspect of the present disclosure, which may be used in combination with any one or more of the preceding aspects, the method further comprises playing a second video advertisement corresponding to the second advertising campaign. In accordance with another exemplary aspect of the present disclosure, which may be used in combination with any one or more of the preceding aspects, collecting user device properties includes performing measurements of the user device properties. In accordance with another exemplary aspect of the present disclosure, which may be used in combination with any one or more of the preceding aspects, the second targeting criteria specifies that at least one of the user device properties is a critical criteria. In accordance with another exemplary aspect of the present disclosure, which may be used in combination with any one or more of the preceding aspects, the user device is configured to abort the second advertising campaign responsive to the critical criteria not being fulfilled. In accordance with another exemplary aspect of the present disclosure, which may be used in combination with any one or more of the preceding aspects, user device properties relating to the critical criteria are collected using a fast data collection path. In accordance with another exemplary aspect of the present disclosure, which may be used in combination with any one or more of the preceding aspects, the critical criteria includes at least one of viewability, video player size, and audio settings. In accordance with another exemplary aspect of the present disclosure, which may be used in combination with any one or more of the preceding aspects, user device properties relating to the secondary criteria are collected using a slower data collection path. In accordance with another exemplary aspect of the present disclosure, which may be used in combination with any one or more of the preceding aspects, the fast data collection path operates in parallel with the slower data collection path. In accordance with another exemplary aspect of the present disclosure, which may be used in combination with any one or more of the preceding aspects, the secondary criteria includes device bandwidth. In accordance with another exemplary aspect of the present disclosure, which may be used in combination with any one or more of the preceding aspects, the method further comprises determining that declared user device properties were at least one of erroneous and fraudulent. In accordance with another exemplary aspect of the present disclosure, which may be used in combination with any one or more of the preceding aspects, a browser in the user device receives the notification of the winning advertising campaign and sends the request for the video advertisement to the advertising server. In accordance with another exemplary aspect of the present disclosure, which may be used in combination with any one or more of the preceding aspects, the method further comprises identifying at least two advertising campaigns that fulfil the second targeting criteria. In accordance with another exemplary aspect of the present disclosure, which may be used in combination with any one or more of the preceding aspects, the method further comprises scoring each of the at least two advertising campaigns and selects a highest scoring video advertising campaign. In accordance with another exemplary aspect of the present disclosure, which may be used in combination with any one or more of the preceding aspects, the method further comprises receiving a default video advertisement responsive to the measured user device property not fulfilling the second targeting criteria of the winning advertising campaign and each respective advertising campaign from the plurality of related advertising campaigns. In accordance with another exemplary aspect of the present disclosure, which may be used in combination with any one or more of the preceding aspects, the method further comprises receiving a VAST/VPAID compliant response that includes a reference to a device-side advertisement API. In accordance with another exemplary aspect of the present disclosure, which may be used in combination with any one or more of the preceding aspects, the browser follows the reference to the device-side advertisement API. In accordance with another exemplary aspect of the present disclosure, which may be used in combination with any one or more of the preceding aspects, the user device properties are retrieved by invoking functionality of the browser. In accordance with another exemplary aspect of the present disclosure, which may be used in combination with any one or more of the preceding aspects, the user device includes a device-side advertisement API that generates a first process that measures user device properties, and generates a second process that selects advertising campaigns, and the first process operates in parallel with the second process. In accordance with another exemplary aspect of the present disclosure, which may be used in combination with any one or more of the preceding aspects, the second process aborts any advertising campaign with critical criteria, responsive to the first process being unable to confirm that the critical criteria is fulfilled. In accordance with another exemplary aspect of the present disclosure, which may be used in combination with any one or more of the preceding aspects, the device-side advertisement API generates a third process that measures viewability of video advertisements, and the third process operates in parallel with the first process and the second process. In accordance with another exemplary aspect of the present disclosure, which may be used in combination with any one or more of the preceding aspects, the third process determines a percentage of the video advertisement that is viewable. In accordance with another exemplary aspect of the present disclosure, which may be used in combination with any one or more of the preceding aspects, the method further comprises perform an assembling operation including parsing, interpreting, and organizing a VAST/VPAID-compliant response from the advertising server. In accordance with another exemplary aspect of the present disclosure, which may be used in combination with any one or more of the preceding aspects, collecting user device properties includes measuring a battery level of the user device. In accordance with another exemplary aspect of the present disclosure, which may be used in combination with any one or more of the preceding aspects, collecting user device properties includes measuring a WiFi connectivity level of the user device. In accordance with another exemplary aspect of the present disclosure, which may be used in combination with any one or more of the preceding aspects, collecting user device properties includes measuring a size of a video player. In accordance with another exemplary aspect of the present disclosure, which may be used in combination with any one or more of the preceding aspects, the user device properties include audio playback settings of the user device. In accordance with another exemplary aspect of the present disclosure, which may be used in combination with any one or more of the preceding aspects, the user device properties include video playback settings of the user device.

In accordance with another exemplary aspect of the present disclosure, which may be used in combination with any one or more of the preceding aspects, a user device comprises: a display; and a processor which is configured to: receive a notification of a winning first advertising campaign that fulfils first targeting criteria; send, to an advertising server, a request for a first video advertisement corresponding to the winning advertising campaign; receive, from the advertising server, a plurality of related advertising campaigns each including the first targeting criteria and second targeting criteria, respectively, wherein each of the plurality of related advertising campaigns are related to the winning first advertising campaign; collect user device properties of the user device including a first user device property required by the second targeting criteria; compare the collected first user device property to the second targeting criteria; and determine that a second advertising campaign from the plurality of related advertising campaigns fulfils the second targeting criteria of the second advertising campaign. In accordance with another exemplary aspect of the present disclosure, which may be used in combination with any one or more of the preceding aspects, the processor selects the second advertising campaign to display on the user device. In accordance with another exemplary aspect of the present disclosure, which may be used in combination with any one or more of the preceding aspects, the display plays a second video advertisement corresponding to the second advertising campaign. In accordance with another exemplary aspect of the present disclosure, which may be used in combination with any one or more of the preceding aspects, collecting user device properties includes performing measurements of the user device properties. In accordance with another exemplary aspect of the present disclosure, which may be used in combination with any one or more of the preceding aspects, the second targeting criteria specifies that at least one of the user device properties is a critical criteria. In accordance with another exemplary aspect of the present disclosure, which may be used in combination with any one or more of the preceding aspects, the user device is configured to abort the second advertising campaign responsive to the critical criteria not being fulfilled. In accordance with another exemplary aspect of the present disclosure, which may be used in combination with any one or more of the preceding aspects, user device properties relating to the critical criteria are collected using a fast data collection path. In accordance with another exemplary aspect of the present disclosure, which may be used in combination with any one or more of the preceding aspects, the critical criteria includes at least one of viewability, video player size, and audio settings. In accordance with another exemplary aspect of the present disclosure, which may be used in combination with any one or more of the preceding aspects, user device properties relating to the secondary criteria are collected using a slower data collection path. In accordance with another exemplary aspect of the present disclosure, which may be used in combination with any one or more of the preceding aspects, the fast data collection path operates in parallel with the slower data collection path. In accordance with another exemplary aspect of the present disclosure, which may be used in combination with any one or more of the preceding aspects, the secondary criteria includes device bandwidth. In accordance with another exemplary aspect of the present disclosure, which may be used in combination with any one or more of the preceding aspects, the processor determines that declared user device properties were at least one of erroneous and fraudulent. In accordance with another exemplary aspect of the present disclosure, which may be used in combination with any one or more of the preceding aspects, a browser in the user device receives the notification of the winning advertising campaign and sends the request for the video advertisement to the advertising server. In accordance with another exemplary aspect of the present disclosure, which may be used in combination with any one or more of the preceding aspects, the processor identifies at least two advertising campaigns that fulfil the second targeting criteria. In accordance with another exemplary aspect of the present disclosure, which may be used in combination with any one or more of the preceding aspects, the processor scores each of the at least two advertising campaigns and selects a highest scoring video advertising campaign. In accordance with another exemplary aspect of the present disclosure, which may be used in combination with any one or more of the preceding aspects, the processor receives a default video advertisement responsive to the measured user device property not fulfilling the second targeting criteria of the winning advertising campaign and each respective advertising campaign from the plurality of related advertising campaigns. In accordance with another exemplary aspect of the present disclosure, which may be used in combination with any one or more of the preceding aspects, the processor receives a VAST/VPAID compliant response that includes a reference to a device-side advertisement API. In accordance with another exemplary aspect of the present disclosure, which may be used in combination with any one or more of the preceding aspects, the browser follows the reference to the device-side advertisement API. In accordance with another exemplary aspect of the present disclosure, which may be used in combination with any one or more of the preceding aspects, the user device properties are retrieved by invoking functionality of the browser. In accordance with another exemplary aspect of the present disclosure, which may be used in combination with any one or more of the preceding aspects, the user device includes a device-side advertisement API that generates a first process that measures user device properties, and generates a second process that selects advertising campaigns, and the first process operates in parallel with the second process. In accordance with another exemplary aspect of the present disclosure, which may be used in combination with any one or more of the preceding aspects, the second process aborts any advertising campaign with critical criteria, responsive to the first process being unable to confirm that the critical criteria is fulfilled. In accordance with another exemplary aspect of the present disclosure, which may be used in combination with any one or more of the preceding aspects, the device-side advertisement API generates a third process that measures viewability of video advertisements, and the third process operates in parallel with the first process and the second process. In accordance with another exemplary aspect of the present disclosure, which may be used in combination with any one or more of the preceding aspects, the third process determines a percentage of the video advertisement that is viewable. In accordance with another exemplary aspect of the present disclosure, which may be used in combination with any one or more of the preceding aspects, the processor performs an assembling operation including parsing, interpreting, and organizing a VAST/VPAID-compliant response from the advertising server. In accordance with another exemplary aspect of the present disclosure, which may be used in combination with any one or more of the preceding aspects, collecting user device properties includes measuring a battery level of the user device. In accordance with another exemplary aspect of the present disclosure, which may be used in combination with any one or more of the preceding aspects, collecting user device properties includes measuring a WiFi connectivity level of the user device. In accordance with another exemplary aspect of the present disclosure, which may be used in combination with any one or more of the preceding aspects, collecting user device properties includes measuring a size of a video player. In accordance with another exemplary aspect of the present disclosure, which may be used in combination with any one or more of the preceding aspects, the user device properties include audio playback settings of the user device. In accordance with another exemplary aspect of the present disclosure, which may be used in combination with any one or more of the preceding aspects, the user device properties include video playback settings of the user device.

In accordance with another exemplary aspect of the present disclosure, which may be used in combination with any one or more of the preceding aspects, a computer readable medium storing instructions which, when executed by a processor in a user device, are configured to: receive a notification of a winning first advertising campaign that fulfils first targeting criteria; send, to an advertising server, a request for a first video advertisement corresponding to the winning advertising campaign; receive, from the advertising server, a plurality of related advertising campaigns each including the first targeting criteria and second targeting criteria, respectively, wherein each of the plurality of related advertising campaigns are related to the winning first advertising campaign; collect user device properties of the user device including a first user device property required by the second targeting criteria; compare the collected first user device property to the second targeting criteria; and determine that a second advertising campaign from the plurality of related advertising campaigns fulfils the second targeting criteria of the second advertising campaign. In accordance with another exemplary aspect of the present disclosure, which may be used in combination with any one or more of the preceding aspects, the processor is further configured to select the second advertising campaign to display on the user device. In accordance with another exemplary aspect of the present disclosure, which may be used in combination with any one or more of the preceding aspects, the display is configured to play a second video advertisement corresponding to the second advertising campaign. In accordance with another exemplary aspect of the present disclosure, which may be used in combination with any one or more of the preceding aspects, collecting user device properties includes performing measurements of the user device properties. In accordance with another exemplary aspect of the present disclosure, which may be used in combination with any one or more of the preceding aspects, the second targeting criteria specifies that at least one of the user device properties is a critical criteria. In accordance with another exemplary aspect of the present disclosure, which may be used in combination with any one or more of the preceding aspects, the user device is configured to abort the second advertising campaign responsive to the critical criteria not being fulfilled. In accordance with another exemplary aspect of the present disclosure, which may be used in combination with any one or more of the preceding aspects, user device properties relating to the critical criteria are collected using a fast data collection path. In accordance with another exemplary aspect of the present disclosure, which may be used in combination with any one or more of the preceding aspects, the critical criteria includes at least one of viewability, video player size, and audio settings. In accordance with another exemplary aspect of the present disclosure, which may be used in combination with any one or more of the preceding aspects, user device properties relating to the secondary criteria are collected using a slower data collection path. In accordance with another exemplary aspect of the present disclosure, which may be used in combination with any one or more of the preceding aspects, the fast data collection path operates in parallel with the slower data collection path. In accordance with another exemplary aspect of the present disclosure, which may be used in combination with any one or more of the preceding aspects, the secondary criteria includes device bandwidth. In accordance with another exemplary aspect of the present disclosure, which may be used in combination with any one or more of the preceding aspects, the processor is further configured to determine that declared user device properties were at least one of erroneous and fraudulent. In accordance with another exemplary aspect of the present disclosure, which may be used in combination with any one or more of the preceding aspects, a browser in the user device receives the notification of the winning advertising campaign and sends the request for the video advertisement to the advertising server. In accordance with another exemplary aspect of the present disclosure, which may be used in combination with any one or more of the preceding aspects, the processor is further configured to identify at least two advertising campaigns that fulfil the second targeting criteria. In accordance with another exemplary aspect of the present disclosure, which may be used in combination with any one or more of the preceding aspects, the processor is further configured to score each of the at least two advertising campaigns and selects a highest scoring video advertising campaign. In accordance with another exemplary aspect of the present disclosure, which may be used in combination with any one or more of the preceding aspects, the processor is further configured to receive a default video advertisement responsive to the measured user device property not fulfilling the second targeting criteria of the winning advertising campaign and each respective advertising campaign from the plurality of related advertising campaigns. In accordance with another exemplary aspect of the present disclosure, which may be used in combination with any one or more of the preceding aspects, the processor is further configured to receive a VAST/VPAID compliant response that includes a reference to a device-side advertisement API. In accordance with another exemplary aspect of the present disclosure, which may be used in combination with any one or more of the preceding aspects, the browser follows the reference to the device-side advertisement API. In accordance with another exemplary aspect of the present disclosure, which may be used in combination with any one or more of the preceding aspects, the user device properties are retrieved by invoking functionality of the browser. In accordance with another exemplary aspect of the present disclosure, which may be used in combination with any one or more of the preceding aspects, the user device includes a device-side advertisement API that generates a first process that measures user device properties, and generates a second process that selects advertising campaigns, and the first process operates in parallel with the second process. In accordance with another exemplary aspect of the present disclosure, which may be used in combination with any one or more of the preceding aspects, the second process aborts any advertising campaign with critical criteria, responsive to the first process being unable to confirm that the critical criteria is fulfilled. In accordance with another exemplary aspect of the present disclosure, which may be used in combination with any one or more of the preceding aspects, the device-side advertisement API generates a third process that measures viewability of video advertisements, and the third process operates in parallel with the first process and the second process. In accordance with another exemplary aspect of the present disclosure, which may be used in combination with any one or more of the preceding aspects, the third process determines a percentage of the video advertisement that is viewable. In accordance with another exemplary aspect of the present disclosure, which may be used in combination with any one or more of the preceding aspects, the processor is further configured to perform an assembling operation including parsing, interpreting, and organizing a VAST/

VPAID-compliant response from the advertising server. In accordance with another exemplary aspect of the present disclosure, which may be used in combination with any one or more of the preceding aspects, collecting user device properties includes measuring a battery level of the user device. In accordance with another exemplary aspect of the present disclosure, which may be used in combination with any one or more of the preceding aspects, collecting user device properties includes measuring a WiFi connectivity level of the user device. In accordance with another exemplary aspect of the present disclosure, which may be used in combination with any one or more of the preceding aspects, collecting user device properties includes measuring a size of a video player. In accordance with another exemplary aspect of the present disclosure, which may be used in combination with any one or more of the preceding aspects, the user device properties include audio playback settings of the user device. In accordance with another exemplary aspect of the present disclosure, which may be used in combination with any one or more of the preceding aspects, the user device properties include video playback settings of the user device.

In accordance with another exemplary aspect of the present disclosure, which may be used in combination with any one or more of the preceding aspects, a system comprises: means for receiving, at a user device, a notification of a winning first advertising campaign that fulfils first targeting criteria; means for sending, to an advertising server, a request for a first video advertisement corresponding to the winning advertising campaign; means for receiving, from the advertising server, a plurality of related advertising campaigns each including the first targeting criteria and second targeting criteria, respectively, wherein each of the plurality of related advertising campaigns are related to the winning first advertising campaign; means for collecting user device properties of the user device including a first user device property required by the second targeting criteria; means for comparing the collected first user device property to the second targeting criteria; and means for determining that a second advertising campaign from the plurality of related advertising campaigns fulfils the second targeting criteria of the second advertising campaign.

In accordance with another exemplary aspect of the present disclosure, which may be used in combination with any one or more of the preceding aspects, a method comprises: collecting a plurality of video viewability predictor data sets, the plurality of video viewability predictor data sets including geometric measurement data, refresh rate slowdown data, and a plurality of different user device properties collected from a user device; dividing the plurality of video viewability data sets into a first set of training data sets and a second set testing data sets; generating parameter values of a prediction model based on the first set of training data sets; assessing the prediction model using the second set of testing data sets; inputting, into the prediction model, a plurality of device properties of the user device; inputting, into the prediction model, a refresh rate slowdown of a video displayed in an unfriendly inline frame displayed on the user device; and outputting, from the prediction model, a viewability inference of the unfriendly inline frame displayed on the user device based on the plurality of device properties of the user device and refresh rate slowdown data of the unfriendly inline frame displayed on the user device. In accordance with another exemplary aspect of the present disclosure, which may be used in combination with any one or more of the preceding aspects, the method further comprises controlling the video displayed in the unfriendly inline frame based on the viewability inference. In accordance with another exemplary aspect of the present disclosure, which may be used in combination with any one or more of the preceding aspects, controlling the video includes pausing the video. In accordance with another exemplary aspect of the present disclosure, which may be used in combination with any one or more of the preceding aspects, controlling the video includes resuming playback of the video. In accordance with another exemplary aspect of the present disclosure, which may be used in combination with any one or more of the preceding aspects, the method further comprises controlling a selection of an advertising campaign based on the viewability inference. In accordance with another exemplary aspect of the present disclosure, which may be used in combination with any one or more of the preceding aspects, the refresh rate slowdown of the video is generated by overlaying markings on the video while the video plays and performing an operation on the markings while the video plays. In accordance with another exemplary aspect of the present disclosure, which may be used in combination with any one or more of the preceding aspects, the markings include text. In accordance with another exemplary aspect of the present disclosure, which may be used in combination with any one or more of the preceding aspects, the markings include at least one of alphanumeric characters and symbols. In accordance with another exemplary aspect of the present disclosure, which may be used in combination with any one or more of the preceding aspects, the operation is a blurring operation. In accordance with another exemplary aspect of the present disclosure, which may be used in combination with any one or more of the preceding aspects, the operation is a dithering operation. In accordance with another exemplary aspect of the present disclosure, which may be used in combination with any one or more of the preceding aspects, the markings are nearly transparent. In accordance with another exemplary aspect of the present disclosure, which may be used in combination with any one or more of the preceding aspects, the plurality of different user device properties include hardware properties. In accordance with another exemplary aspect of the present disclosure, which may be used in combination with any one or more of the preceding aspects, the hardware properties include a type of processor. In accordance with another exemplary aspect of the present disclosure, which may be used in combination with any one or more of the preceding aspects, the hardware properties include a GPS module. In accordance with another exemplary aspect of the present disclosure, which may be used in combination with any one or more of the preceding aspects, the hardware properties include a WiFi chipset. In accordance with another exemplary aspect of the present disclosure, which may be used in combination with any one or more of the preceding aspects, the hardware properties include an audio capabilities. In accordance with another exemplary aspect of the present disclosure, which may be used in combination with any one or more of the preceding aspects, the hardware properties include a device type of one of laptop, desktop, and mobile device. In accordance with another exemplary aspect of the present disclosure, which may be used in combination with any one or more of the preceding aspects, the plurality of different user device properties include software properties. In accordance with another exemplary aspect of the present disclosure, which may be used in combination with any one or more of the preceding aspects, the software properties include a measured video player size. In accordance with another exemplary aspect of the present disclosure, which may be used in combination with any one or more of the preceding aspects, the software properties include a measured video player resolution. In accordance with another exemplary aspect of the present disclosure, which may be used in combination with any one or more of the preceding aspects, the plurality of different user device properties include a detected latitude and longitude of the user device.

In accordance with another exemplary aspect of the present disclosure, which may be used in combination with any one or more of the preceding aspects, a system comprises: at least one processor configured to: collect a plurality of video viewability predictor data sets, the plurality of video viewability predictor data sets including geometric measurement data, refresh rate slowdown data, and a plurality of different user device properties collected from a user device; divide the plurality of video viewability data sets into a first set of training data sets and a second set testing data sets; generate parameter values of a prediction model based on the first set of training data sets; assess the prediction model using the second set of testing data sets; input, into the prediction model, a plurality of device properties of the user device; input, into the prediction model, a refresh rate slowdown of a video displayed in an unfriendly inline frame displayed on the user device; and output, from the prediction model, a viewability inference of the unfriendly inline frame displayed on the user device based on the plurality of device properties of the user device and refresh rate slowdown data of the unfriendly inline frame displayed on the user device. In accordance with another exemplary aspect of the present disclosure, which may be used in combination with any one or more of the preceding aspects, the at least one processor controls the video displayed in the unfriendly inline frame based on the viewability inference. In accordance with another exemplary aspect of the present disclosure, which may be used in combination with any one or more of the preceding aspects, controlling the video includes pausing the video. In accordance with another exemplary aspect of the present disclosure, which may be used in combination with any one or more of the preceding aspects, controlling the video includes resuming playback of the video. In accordance with another exemplary aspect of the present disclosure, which may be used in combination with any one or more of the preceding aspects, the at least one processor controls a selection of an advertising campaign based on the viewability inference. In accordance with another exemplary aspect of the present disclosure, which may be used in combination with any one or more of the preceding aspects, the refresh rate slowdown of the video is generated by overlaying markings on the video while the video plays and performing an operation on the markings while the video plays. In accordance with another exemplary aspect of the present disclosure, which may be used in combination with any one or more of the preceding aspects, the markings include text. In accordance with another exemplary aspect of the present disclosure, which may be used in combination with any one or more of the preceding aspects, the markings include at least one of alphanumeric characters and symbols. In accordance with another exemplary aspect of the present disclosure, which may be used in combination with any one or more of the preceding aspects, the operation is a blurring operation. In accordance with another exemplary aspect of the present disclosure, which may be used in combination with any one or more of the preceding aspects, the operation is a dithering operation. In accordance with another exemplary aspect of the present disclosure, which may be used in combination with any one or more of the preceding aspects, the markings are nearly transparent. In accordance with another exemplary aspect of the present disclosure, which may be used in combination with any one or more of the preceding aspects, the plurality of different user device properties include hardware properties. In accordance with another exemplary aspect of the present disclosure, which may be used in combination with any one or more of the preceding aspects, the hardware properties include a type of processor. In accordance with another exemplary aspect of the present disclosure, which may be used in combination with any one or more of the preceding aspects, the hardware properties include a GPS module. In accordance with another exemplary aspect of the present disclosure, which may be used in combination with any one or more of the preceding aspects, the hardware properties include a WiFi chipset. In accordance with another exemplary aspect of the present disclosure, which may be used in combination with any one or more of the preceding aspects, the hardware properties include an audio capabilities. In accordance with another exemplary aspect of the present disclosure, which may be used in combination with any one or more of the preceding aspects, the hardware properties include a device type of one of laptop, desktop, and mobile device. In accordance with another exemplary aspect of the present disclosure, which may be used in combination with any one or more of the preceding aspects, the plurality of different user device properties include software properties. In accordance with another exemplary aspect of the present disclosure, which may be used in combination with any one or more of the preceding aspects, the software properties include a measured video player size. In accordance with another exemplary aspect of the present disclosure, which may be used in combination with any one or more of the preceding aspects, the software properties include a measured video player resolution. In accordance with another exemplary aspect of the present disclosure, which may be used in combination with any one or more of the preceding aspects, the plurality of different user device properties include a detected latitude and longitude of the user device.

In accordance with another exemplary aspect of the present disclosure, which may be used in combination with any one or more of the preceding aspects, a computer readable medium stores instructions which, when executed by a processor, are configured to: collect a plurality of video viewability predictor data sets, the plurality of video viewability predictor data sets including geometric measurement data, refresh rate slowdown data, and a plurality of different user device properties collected from a user device; divide the plurality of video viewability data sets into a first set of training data sets and a second set testing data sets; generate parameter values of a prediction model based on the first set of training data sets; assess the prediction model using the second set of testing data sets; input, into the prediction model, a plurality of device properties of the user device; input, into the prediction model, a refresh rate slowdown of a video displayed in an unfriendly inline frame displayed on the user device; and output, from the prediction model, a viewability inference of the unfriendly inline frame displayed on the user device based on the plurality of device properties of the user device and refresh rate slowdown data of the unfriendly inline frame displayed on the user device. In accordance with another exemplary aspect of the present disclosure, which may be used in combination with any one or more of the preceding aspects, the processor controls the video displayed in the unfriendly inline frame based on the viewability inference. In accordance with another exemplary aspect of the present disclosure, which may be used in combination with any one or more of the preceding aspects, controlling the video includes pausing the video. In accordance with another exemplary aspect of the present disclosure, which may be used in combination with any one or more of the preceding aspects, controlling the video includes resuming playback of the video. In accordance with another exemplary aspect of the present disclosure, which may be used in combination with any one or more of the preceding aspects, the processor controls a selection of an advertising campaign based on the viewability inference. In accordance with another exemplary aspect of the present disclosure, which may be used in combination with any one or more of the preceding aspects, the refresh rate slowdown of the video is generated by overlaying markings on the video while the video plays and performing an operation on the markings while the video plays. In accordance with another exemplary aspect of the present disclosure, which may be used in combination with any one or more of the preceding aspects, the markings include text. In accordance with another exemplary aspect of the present disclosure, which may be used in combination with any one or more of the preceding aspects, the markings include at least one of alphanumeric characters and symbols. In accordance with another exemplary aspect of the present disclosure, which may be used in combination with any one or more of the preceding aspects, the operation is a blurring operation. In accordance with another exemplary aspect of the present disclosure, which may be used in combination with any one or more of the preceding aspects, the operation is a dithering operation. In accordance with another exemplary aspect of the present disclosure, which may be used in combination with any one or more of the preceding aspects, the markings are nearly transparent. In accordance with another exemplary aspect of the present disclosure, which may be used in combination with any one or more of the preceding aspects, the plurality of different user device properties include hardware properties. In accordance with another exemplary aspect of the present disclosure, which may be used in combination with any one or more of the preceding aspects, the hardware properties include a type of processor. In accordance with another exemplary aspect of the present disclosure, which may be used in combination with any one or more of the preceding aspects, the hardware properties include a GPS module. In accordance with another exemplary aspect of the present disclosure, which may be used in combination with any one or more of the preceding aspects, the hardware properties include a WiFi chipset. In accordance with another exemplary aspect of the present disclosure, which may be used in combination with any one or more of the preceding aspects, the hardware properties include an audio capabilities. In accordance with another exemplary aspect of the present disclosure, which may be used in combination with any one or more of the preceding aspects, the hardware properties include a device type of one of laptop, desktop, and mobile device. In accordance with another exemplary aspect of the present disclosure, which may be used in combination with any one or more of the preceding aspects, the plurality of different user device properties include software properties. In accordance with another exemplary aspect of the present disclosure, which may be used in combination with any one or more of the preceding aspects, the software properties include a measured video player size. In accordance with another exemplary aspect of the present disclosure, which may be used in combination with any one or more of the preceding aspects, the software properties include a measured video player resolution. In accordance with another exemplary aspect of the present disclosure, which may be used in combination with any one or more of the preceding aspects, the plurality of different user device properties include a detected latitude and longitude of the user device.

In accordance with another exemplary aspect of the present disclosure, which may be used in combination with any one or more of the preceding aspects, a system comprises: means for collecting a plurality of video viewability predictor data sets, the plurality of video viewability predictor data sets including geometric measurement data, refresh rate slowdown data, and a plurality of different user device properties collected from a user device; means for dividing the plurality of video viewability data sets into a first set of training data sets and a second set testing data sets; means for generating parameter values of a prediction model based on the first set of training data sets; means for assessing the prediction model using the second set of testing data sets; means for inputting, into the prediction model, a plurality of device properties of the user device; means for inputting, into the prediction model, a refresh rate slowdown of a video displayed in an unfriendly inline frame displayed on the user device; and means for outputting, from the prediction model, a viewability inference of the unfriendly inline frame displayed on the user device based on the plurality of device properties of the user device and refresh rate slowdown data of the unfriendly inline frame displayed on the user device. In accordance with another exemplary aspect of the present disclosure, which may be used in combination with any one or more of the preceding aspects, the system further comprises means for controlling the video displayed in the unfriendly inline frame based on the viewability inference. In accordance with another exemplary aspect of the present disclosure, which may be used in combination with any one or more of the preceding aspects, the system further comprises means for controlling a selection of an advertising campaign based on the viewability inference.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure.

The invention is claimed as follows:

1. A method comprising:
playing a video on a display of an electronic device, wherein the video has a height and a width;
predicting, using a processor, a portion of the video that is viewable by splitting the video into a plurality of tiles;
invoking, using a device-side advertisement Application Program Interface (API), a browser refresh callback function to issue a callback from a browser to the device-side advertisement API when the browser refreshes the tiles of the video;
at a first time while the video plays on the display, measuring a first refresh rate for each tile of the plurality of tiles of the video using the device-side advertisement API;
overlaying markings, using the device-side advertisement API, on each tile of the plurality of tiles of the video while the video plays;
at a second time while the video plays on the display, performing, using the device-side advertisement API, a first processor-based operation on the markings;

while the video plays on the display at the second time, performing, by the processor, a refreshing operation, and the first processor-based operation slows down the refreshing operation of viewable tiles of the video;

measuring a second refresh rate for each tile of the plurality of tiles of the video at the second time during the refreshing operation;

predicting, by the device-side advertisement API, whether each tile of the plurality of tiles is viewable based on the second refresh rate and properties of end user device; and determining an estimated area of the video displayed on the display based on the first refresh rate, the second refresh rate, and a number of predicted viewable tiles of the plurality of tiles of the video, wherein the estimated area is indicative of a viewability of the video.

2. The method of claim 1, further comprising comparing the estimated area of the video displayed on the display to a threshold area.

3. The method of claim 2, further comprising responsive to the estimated area of the video displayed on the display being less than the threshold area, pausing the video.

4. The method of claim 1, wherein the first processor-based operation includes blurring, which slows down the refreshing operation of the viewable tiles of the video.

5. The method of claim 1, further comprising: performing, by the processor, a second operation on the markings while the video plays; and measuring a third refresh rate of the video at the third time, wherein the estimated area of the video displayed on the display at the third time is determined based on the first refresh rate, the second refresh rate, and the third refresh rate.

6. The method of claim 5, further comprising: comparing the estimated area of the video displayed on the display at the third time to the threshold area; and responsive to the estimated area of the video displayed on the display being greater than the threshold area, resume playing the video.

7. The method of claim 1, wherein the markings on the video include at least one of alphanumeric characters and symbols.

8. The method of claim 1, wherein determining the estimated area of the video displayed on the display includes comparing the first refresh rate to the second refresh rate.

9. The method of claim 1, wherein the first processor-based operation includes dithering, which slows down the refreshing operation of the viewable tiles of the video.

10. The method of claim 1, wherein the markings are substantially invisible to a user.

11. The method of claim 1, wherein determining the estimated area of the video displayed on the display is based on a refresh rate slowdown.

12. The method of claim 1, wherein the first refresh rate is greater than the second refresh rate when at least a first area of the video is displayed on the display.

13. The method of claim 1, wherein the first refresh rate is measured in frames per second.

14. The method of claim 1, wherein the second time is at least 100 milliseconds after the first time.

15. The method of claim 1, wherein the video is played in an inline frame.

16. The method of claim 15, wherein the video is displayed in native video player.

17. The method of claim 15, further comprising: executing a geometric determination of the estimated area of the video displayed in the inline frame.

18. The method of claim 1, wherein the video is displayed in a viewport, which includes a viewable portion of content that is adjustable through scrolling.

19. The method of claim 18, wherein the estimated area of the video displayed on the display changes based on a user scrolling at least one of vertically and laterally within the viewport.

20. A client comprising:
an electronic display; and
a processor that controls the display to:
play a video on the display, wherein the video has a height and a width;
predict, using a processor, a portion of the video that is viewable by splitting the video into a plurality of tiles;
invoke, using a device-side advertisement Application Program Interface (API), a browser refresh callback function to issue a callback from a browser to the device-side advertisement API when the browser refreshes the tiles of the video;
at a first time while the video plays on the display, measure a first refresh rate for each tile of the plurality of tiles of the video using the device-side advertisement API;
overlay markings, using the device-side advertisement API, on each tile of the plurality of tiles of the video while the video plays;
at a second time while the video plays on the display, perform, using the device-side advertisement API, a first processor-based operation on the markings;
while the video plays on the display at the second time, perform, by the processor, a refreshing operation, and the first processor-based operation slows down the refreshing operation of viewable tiles of the video;
measure a second refresh rate for each tile of the plurality of tiles of the video at the second time during the refreshing operation;
predict, by the device-side advertisement API, whether each tile of the plurality of tiles is viewable based on the second refresh rate and properties of end user device; and
determine an estimated area of the video displayed on the display based on the first refresh rate, the second refresh rate, and a number of predicted viewable tiles of the plurality of tiles of the video, wherein the estimated area is indicative of a viewability of the video.

21. The client of claim 20, wherein the processor sends the first refresh rate and the second refresh rate to a server.

22. The client of claim 21, wherein the server determines the estimated area of the video displayed on the display based on the first refresh rate and the second refresh rate.

23. The client of claim 22, wherein determining the estimated area of the video displayed on the display includes comparing the first refresh rate to the second refresh rate.

24. The client of claim 22, wherein the server sends the estimated area of the video displayed on the display to the client.

25. The client of claim 22, wherein determining the estimated area of the video displayed on the display is based on a refresh rate slowdown.

26. A non-transitory computer readable medium storing instructions which, when executed by a processor:
play a video on a display of an electronic device, wherein the video has a height and a width;
predict, using the processor, a portion of the video that is viewable by splitting the video into a plurality of tiles;
invoke, using a device-side advertisement Application Program Interface (API), a browser refresh callback function to issue a callback from a browser to the device-side advertisement API when the browser refreshes the tiles of the video;
at a first time while the video plays on the display, measure a first refresh rate for each tile of the plurality of tiles of the video using the device-side advertisement API;
overlay markings, using the device-side advertisement API, on each tile of the plurality of tiles of the video while the video plays;
at a second time while the video plays on the display, perform, using the device-side advertisement API, a first processor-based operation on the markings;
while the video plays on the display at the second time, perform, by the processor, a refreshing operation, and the first processor-based operation slows down the refreshing operation of viewable tiles of the video;
measure a second refresh rate for each tile of the plurality of tiles of the video at the second time during the refreshing operation;
predict, by the device-side advertisement API, whether each tile of the plurality of tiles is viewable based on the second refresh rate and properties of end user device; and
determine an estimated area of the video displayed on the display based on the first refresh rate, the second refresh rate, and a number of predicted viewable tiles of the plurality of tiles of the video, wherein the estimated area is indicative of a viewability of the video.

* * * * *